(12) United States Patent
Johnston-Watt et al.

(10) Patent No.: US 8,812,729 B2
(45) Date of Patent: *Aug. 19, 2014

(54) SELF-MANAGED DISTRIBUTED MEDIATION NETWORKS

(75) Inventors: Duncan Johnston-Watt, Edinburgh (GB); Alex Heneveld, Lauder (GB); Richard Connor, Glasgow (GB); Alan Dearle, Fife (GB)

(73) Assignee: Cloudsoft Corporation Limited, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,027

(22) Filed: Apr. 26, 2012

(65) Prior Publication Data

US 2012/0209980 A1    Aug. 16, 2012

Related U.S. Application Data

(62) Division of application No. 11/761,523, filed on Jun. 12, 2007.

(60) Provisional application No. 60/804,524, filed on Jun. 12, 2006.

(51) Int. Cl.
*G06F 15/173* (2006.01)
*H04L 29/08* (2006.01)

(52) U.S. Cl.
CPC .......... *H04L 67/327* (2013.01); *H04L 67/1014* (2013.01)
USPC .......................................... 709/238; 709/239

(58) Field of Classification Search
CPC ........................... H04L 67/327; H04L 67/1014
USPC ..................................... 709/238, 239
See application file for complete search history.

(56) References Cited

U.S. PATENT DOCUMENTS

| | | | |
|---|---|---|---|
| 5,769,527 A * | 6/1998 | Taylor et al. .................... 362/85 |
| 6,128,279 A | 10/2000 | O'Neil et al. |
| 6,816,493 B2 | 11/2004 | Shi et al. |
| 6,944,785 B2 | 9/2005 | Gadir et al. |
| 7,111,074 B2 | 9/2006 | Basturk |
| 7,167,865 B1 | 1/2007 | Tharp et al. |
| 7,185,077 B1 | 2/2007 | O'Toole et al. |
| 7,203,743 B2 | 4/2007 | Shah-Heydari |
| 7,213,246 B1 | 5/2007 | van Rietschote et al. |
| 7,251,222 B2 | 7/2007 | Chen et al. |
| 7,254,109 B2 | 8/2007 | Verma et al. |
| 7,296,191 B2 | 11/2007 | Bae et al. |
| 7,362,709 B1 | 4/2008 | Hui et al. |
| 7,380,017 B2 | 5/2008 | Weil et al. |
| 7,403,980 B2 | 7/2008 | Stringer-Calvert et al. |
| 7,447,774 B2 | 11/2008 | Viswanath et al. |

(Continued)

FOREIGN PATENT DOCUMENTS

| | | | |
|---|---|---|---|
| EP | 1035751 A2 | 9/2000 |
| EP | 1043671 A2 | 10/2000 |
| WO | 9923784 A2 | 5/1999 |
| WO | 2005013554 A2 | 2/2005 |

*Primary Examiner* — Boris Gorney
(74) *Attorney, Agent, or Firm* — Sughrue Mion, PLLC

(57) ABSTRACT

A distributed mediation network and method of employing such is provided, having a plurality of different types of network module. Each module has a non-reciprocal path therethrough for network traffic and the distribution of network traffic across the network is managed by an autonomic control plane.

36 Claims, 30 Drawing Sheets

(56) References Cited

U.S. PATENT DOCUMENTS

| | | |
|---|---|---|
| 7,467,225 B2 | 12/2008 | Anerousis et al. |
| 2002/0018614 A1* | 2/2002 | Mills et al. ............... 385/17 |
| 2002/0046287 A1 | 4/2002 | La Porta et al. |
| 2002/0116397 A1 | 8/2002 | Berg |
| 2003/0007461 A1 | 1/2003 | Chen et al. |
| 2004/0098447 A1 | 5/2004 | Verbeke et al. |
| 2004/0103193 A1* | 5/2004 | Pandya et al. ............ 709/224 |
| 2004/0205250 A1 | 10/2004 | Bain et al. |
| 2004/0255050 A1 | 12/2004 | Takehiro et al. |
| 2004/0260745 A1 | 12/2004 | Gage et al. |
| 2004/0267920 A1 | 12/2004 | Hydrie et al. |
| 2005/0044268 A1* | 2/2005 | Johnston-Watt et al. ...... 709/238 |
| 2005/0060380 A1* | 3/2005 | Dearle et al. ............ 709/206 |
| 2005/0102405 A1 | 5/2005 | Siegel |
| 2005/0198335 A1* | 9/2005 | Brown et al. ............ 709/229 |
| 2005/0283525 A1 | 12/2005 | O'Neal et al. |

\* cited by examiner

Fig 13

| Management Locus | Workload Metric (msgs/sec) | Condition | Action | Exception |
|---|---|---|---|---|
| M Cloud Manager | W=throughput, and w(s) = throughput per segment "s" | M node HIGH (W > M_NODE_HIGH_WATERMARK) | MOVE M SEGMENTS, to least-loaded M node | If only one M segment on overloaded M node, then inform DMN manager |
| | | all M nodes HIGH (AVG(W) > M_NODE_POOL_HIGH_WATERMARK) | ADD M NODE (request to DMN Manager); then respond to individual "M node HIGH" events | None |
| MR Cloud Manager | W=throughput, and w(n) = throughput per upstream LPP node "n" | MR node HIGH (W > MR_NODE_HIGH_WATERMARK) | REASSIGN LPP | If only 1 upstream LPP on overloaded MR node, then inform DMN manager |
| | | all MR nodes HIGH (AVG(W) > MR_NODE_POOL_HIGH_WATERMARK) | ADD MR NODE (request to DMN Manager); then respond to individual "MR node HIGH" events | None |
| TP Cloud Manager | W=throughput, and w(n) = throughput per upstream M node "n" | TP node HIGH (W > TP_NODE_HIGH_WATERMARK) | MOVE M SEGMENTS or REASSIGN M | If only 1 upstream TP on overloaded TP node, then inform DMN manager |
| | | all TP nodes HIGH (AVG(W) > TP_NODE_POOL_HIGH_WATERMARK) | ADD TP NODE (request to DMN Manager); then respond to individual "TP node HIGH" events | None |
| DMN Manager | n/a | Exception from one of the cloud managers | Various (see text) | |
| | | ADD NODE request, resources available | Allocate resource to cloud and kick off ADD NODE operation | |
| | | ADD NODE request, resources unavailable | Various (see text) | |

SELF-MANAGED DISTRIBUTED MEDIATION NETWORKS

CROSS REFERENCE TO RELATED APPLICATION

This application is a Divisional of U.S. application Ser. No. 11/761,523 filed Jun. 12, 2007, which claims priority from U.S. Provisional Patent Application Ser. No. 60/804,524 entitled "Self-Managed Distributed Mediation Networks" filed Jun. 12, 2006. The contents of the prior applications are incorporated by reference in their entirety.

INTRODUCTION

The present invention relates to self-managed distributed mediation networks having a requirement both for disseminated, peer-to-peer communication, and for a degree of control of information gathering over the sum of such disseminated messages.

BACKGROUND TO THE INVENTION

Peer-to-peer (P2P) communication systems allow computational entities (peers) to establish software connections (virtual channels) between one another. P2P systems therefore allow peers to communicate or share computational tasks and resources without the explicit need for centralised control. P2P can operate in a generalised network having one or more servers: a peer may provide information (publish) to at least one service on the network and/or register (subscribe) with services on that network to receive information published by another peer.

Messaging systems that benefit from the provision of centralised control are also known. Here, all messages are directed from publishers to subscribers, via a central locus where some computation (mediation) is performed on the messages. New messages (digests, for example) are generated from the input messages and sent to appropriate subscribers.

In prior art centralised mediation systems, all message traffic is transmitted through a central network point (locus), where the mediation service resides. Viewed in terms of logical elements, such systems are constructed as a star-shaped architectural model with a central point of control, where mediation tasks are executed. This model is shown in FIG. 1A: each source (publisher) and sink (subscriber) of information has a line of communication that connects to the central mediation hub. In many cases, the sources and sinks represent the same entities operating in different modes, and may not be architecturally distinguishable.

The problems associated with such an architecture are well known. They are prone to suffer from a lack of bandwidth at the point of mediation. Even though the logical star shape may be superimposed upon a physical network that is highly connected, the essential flow of all information through a central point causes an inherent throughput bottleneck, based upon the bandwidth available between this point and the network (see FIG. 1B). Although advances in networking technologies mean that bandwidth availability continues to improve, increasing bandwidth has an inherent financial cost, and in certain scenarios can cause a real limitation to the throughput of the overall system. This limitation is manifested as a restriction on either the maximum number of users, or the rate at which each user is able to send and receive information.

Indeed there are many examples of systems where neither P2P architectures nor centralised mediation architectures are wholly satisfactory. Often some logical process is required to act over the sum of messages broadcast within the messaging system. Examples of classes of systems where neither architecture is completely suitable include: a trading system where potential buyers and sellers advertise to each other, mediation is required to ensure a transactional matching of requirements; a mediated news or publishing system where a central authority acts as the editorial control, before information is disseminated; a system which is not actively controlled but which requires an ordered log of information flow to be maintained in a central repository; a conversation service which allows a recent context to be presented to a user joining an ongoing conversation; distributing cryptographic keys (the so-called key distribution problem); systems for finding the location of data (state) and services on a distributed network; and systems for locating and communicating with mobile users.

All the examples above have in common a requirement both for peer-to-peer communication, and for a degree of centralised mediation of the flow of information when the communication is viewed as a whole.

Applicant's co-pending U.S. patent application Ser. No. 10/903,156, incorporated herein by reference, describes a distributed mediation network that overcomes many of the disadvantages described above. A distributed mediation network of this type overcomes the problems associated with providing a mediation service at a single server by distributing the service among a number of logically discrete entities. In order to do this, a mediation application must be amenable to logical partitioning into discrete mediation application components. This permits the mediation service to be partitioned into a set of mediation segment services distributed across a resource pool of servers, with each server providing the mediation service for one or more of these segment services. Hereinafter, this approach will be termed distributed mediation.

To properly eliminate the bandwidth problems at every mediation point, it must be possible to evenly load balance the mediation service across the available resource pool. In systems that exhibit fluctuating demands over time the load across the pool must be dynamically balanced. As such, it must be possible to dynamically change the way in which the application is partitioned. It is therefore necessary to be able to move a mediation segment service from one server to another. Moreover, the movement of a segment service must preserve externally observed causality. That is, the ordering of the interactions with each segment service must be preserved in the face of changes to how that segment service is implemented. This requirement is vitally important in many systems in which out of order interactions have serious consequences, such as financial systems.

In the distributed mediation network, information is classified by content, and mediation requirements are separately served in different processes according to that content-based classification. As demand varies with time over the classification, the corresponding mediation application components may be physically moved to balance both network and computational loads for the whole system. Such load balancing can satisfy the demands placed upon it up to some threshold governed by the sum of the computational, I/O and memory resources of the available servers offering mediation. Beyond this threshold, the quality of service will degrade as the available resources simply cannot handle the load. In order to address this problem, a distributed mediation network will preferably provide mechanisms for the introduction of additional computer resources to the system. Similarly, when excessive resources are available to a mediated application it is preferably possible to remove deployed computational capacity.

The term 'autonomic' has historically been used to refer to the aspect of the nervous system that acts subconsciously to regulate the body, such as the control of breathing rates or the heartbeat. It has recently been used to refer to computer networks that are capable of analogous self-regulation. An autonomic system may be capable of, amongst other things, self-repair, self-configuration, self-monitoring, and self-optimisation, all without the need for external input. Indeed, in the autonomic paradigm, any changes that occur autonomically are in fact impossible for the user to detect.

An autonomic computing system consists of autonomic elements. These autonomic elements are logical constructs that monitor some aspect of the system, analysing its output and taking specific actions to adjust it, so that the overall system is able to meet specific requirements, often expressed as service level agreements (SLAs). SLAs specify the information technology resources needed by a line of business and the specific applications that they maintain.

Autonomic elements are self-organising and are able to discover each other, operate independently, negotiate or collaborate as required, and organise themselves such that the emergent stratified management of the system as a whole reflects both the bottom up demand for resources and the top down business-directed application of those resources to achieve specific goals.

It is an object of the present invention to provide autonomic functionality to a distributed mediation network.

Throughout this document, only the term physical node refers to physical machines. The terms "node" and "logical node" are used interchangeably to refer to the locus having state properties. In terms of the logical topology of the mediation network, a module provides the functionality of an associated logical node.

Hereinafter, the term "high watermark" is used to indicate a maximum threshold level of traffic that may be handled by a single element or node within the network, while the term "low watermark" indicates the minimum threshold, each element being configured to handle traffic levels in a range between the high watermark and the low watermark.

SUMMARY OF THE INVENTION

According to a first aspect of the present invention, there is provided a distributed mediation network, comprising:
a plurality of types of network module, including:
local points of presence (LPP) modules for receiving and transmitting network traffic between the mediation network and client programs;
mediator (M) modules for hosting mediation tasks;
mediator router (MR) modules for analyzing the content of incoming messages, each MR module routing the incoming messages to a predetermined mediation task in dependence upon said content; and,
transmission proxy (TP) modules for forwarding messages to at least one of said LPP modules, wherein each of the MR, M and TP modules are adapted such that all paths for network traffic therethrough are non-reciprocal; and,
an autonomic control plane for managing the distribution of network traffic amongst the modules.

Preferably, the network couples network traffic along a unidirectional mediation cycle, in which: LPP modules address MR modules, MR modules in turn address M modules, M modules in turn address TP modules, and TP modules in turn address LPP modules.

According to a second aspect of the present invention, there is provided method for mediating the flow of network traffic in a computer network, wherein the computer network has a mediation network that comprises: a plurality of types of network module, including:
local points of presence (LPP) modules for receiving and transmitting network traffic between the mediation network and client programs;
mediator (M) modules for hosting mediation tasks;
mediator router (MR) modules for analyzing the content of incoming messages, each MR module routing the incoming messages to a predetermined mediation task in dependence upon said content; and,
transmission proxy (TP) modules for forwarding messages to at least one of said LPP modules, wherein each of the MR, M and TP modules are adapted such that all paths for network traffic therethrough are non-reciprocal; and,
an autonomic control plane for managing the distribution of network traffic amongst the modules,
wherein, in the method, incoming messages are propagated along a mediation cycle that comprises the steps of:
an LPP module addressing incoming messages to a respective one of said at least one mediator router (MR) modules;
at said addressed MR module, analyzing the content of incoming messages and routing said messages to a predetermined mediator module in dependence upon said analyzed content;
at said predetermined mediator module, applying the mediation task to said analyzed messages and directing mediated messages to a respective one of said TP modules; and
at said TP module that receives said mediated messages, forwarding said mediated messages to at least one of said LPP modules.

The present invention provides a distributed mediation network in which the traffic load on each node or module is autonomically managed. The autonomic control plane adjusts the distribution of network traffic amongst the modules/nodes according to the circumstances in which the network finds itself.

The paths for the network traffic passing through the modules are non-reciprocal. That is, while the network paths between modules are unidirectional, the modules may direct network traffic in more than one direction. For instance, a given MR module may receive traffic from a plurality of LPP modules and may direct traffic to a plurality of M modules, but may not direct traffic to LPP modules or receive traffic from M modules. The result is a cyclic network, in which network traffic passes from LPP to MR to M to TP to LPP.

As well as network traffic or messages, control messages/signals may be passed through the network in order to effect commands given by the autonomic control plane. Control messages need not necessarily follow the non-reciprocal paths through the modules that are followed by network messages. Nevertheless, in some embodiments control messages cannot flow against the unidirectional paths followed by network traffic between nodes. For example, in such embodiments, a control message may not be directed against the cycle followed by network traffic (for example, a control message cannot pass from an M module to an MR module, or from an LPP module to a TP module).

In a preferred embodiment, the autonomic control plane receives information regarding the status of nodes within the distributed network from sensor interfaces incorporated therein, and may instruct action by the nodes through effector interfaces.

In a preferred embodiment, the control plane is itself distributed across a number of resources. This allows the control plane to continue functioning should one or more of these resources malfunction, and, moreover, allows the spread of the computational load due to autonomic functions to be optimally distributed at any given time. For example, should one resource be in heavy demand to perform an unrelated task, the remaining resources may assume the burden of autonomic control.

The autonomic control plane is therefore able to monitor the overall status of the network and adjust aspects of the architecture in order to optimise use of the available resources. In particular, the mediation tasks represent segments of an offered mediation service, and the autonomic control plain is therefore effective to distribute the overall mediation service across the available M modules such that no one M module is overloaded. The autonomic control plane may also manage traffic levels on the MR and TPP modules by altering the destination of traffic from the M and LPP modules respectively.

The autonomic control plane may also be capable of increasing and decreasing the number of at least the cross-stream modules (the Ms and MRs), and preferably those of the TPs and LPPs, in order to ensure that there is sufficient capacity in the system. Preferably, the autonomic control plane may cause traffic to be directed through the LPP, MR, and TP modules in such a way as to ensure that no one module is overloaded. As stated above, traffic passes through the M modules in dependence on the mediation segment service required.

Preferably, the autonomic control plane has a hierarchical structure, with a single autonomic manager for each type of network module, known as cloud managers, and an overall distributed mediation network manager that acts as an autonomic manager to the cloud managers. In some examples, the cloud managers may contain further divisions, for example into geographic regions. One advantage of such a structure is that the cloud manager optimising the use of the M modules may act independently other types of network module. For instance, it may be that a first business entity responsible for an LPP employs a second business entity, responsible for the Ms, to provide a mediation service, and the two business entities are hesitant to allow access to each other's resources for security reasons. The preferred hierarchical structure of the autonomic control plane is sufficient to securely separate these two tasks.

The distributed mediation network manager is responsible for allocating resources to the cloud managers but need not be aware of the purpose for which these resources are intended.

The distributed mediation architecture of the present invention is capable of autonomically load balancing a mediation service across a number of servers, thereby enabling the resources consumed by a mediated application to be dynamically adjusted. This is achieved without any breaks in service while maintaining causal delivery of messages to and from the mediated application.

In accordance with the above, a number of key benefits are offered by the present invention:
services are independent of location
the architecture is scalable in that no node requires global knowledge of the system
the architecture is dynamic—services may be redeployed, and new nodes may be transparently added or removed as required, and
the architecture is autonomic—operational policies automatically optimise the size of the resource pool, the distributed mediation network topology, and the distribution of services.

BRIEF DESCRIPTION OF THE DRAWINGS

Examples of the present invention will now be described in detail with reference to the accompanying drawings, in which:

FIG. 13 illustrates a range of actions undertaken by the autonomic control plane, and the circumstances in which they occur.

DETAILED DESCRIPTION

The P2P and centrally mediated messaging models that provide the background to the present invention are first explained. Throughout this discussion, the term source designates a client that generates new messages to send into a network service and the term sink designates a client that receives messages from a network service. Each client of a network service may be a source, a sink, or both. In an alternative terminology, sources of information are referred to as publishers and sinks for information are referred to as subscribers.

In peer-to-peer content-based routing, a network is configured to allow the efficient transmission of messages from source to sink, based upon the establishment of virtual channels between the appropriate sources and sinks. Efficiency is typically achieved by the detection and removal of unnecessary edges (lines of communication connecting nodes) from a fully connected graph, with the resulting optimised graph then tailored to available network infrastructure. To establish a P2P virtual channel requires an expression of interest from one peer and an acceptance of that interest by the other peer.

Figure 1A:
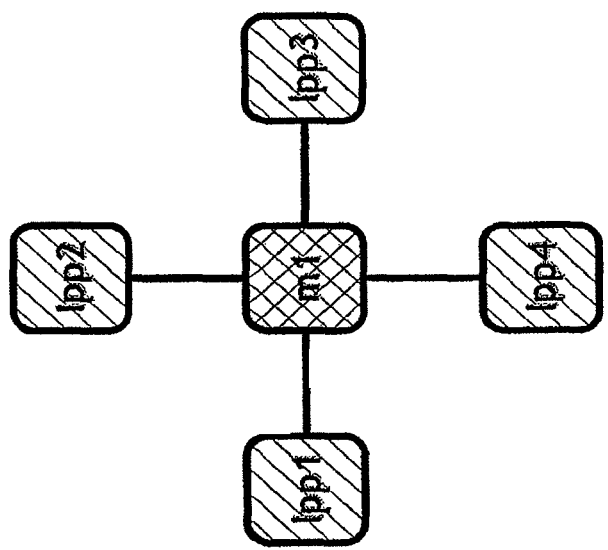
FIG. 1A is a node diagram showing a prior art mediated information flow system with a star-shaped logical architecture.
Figure 1B:
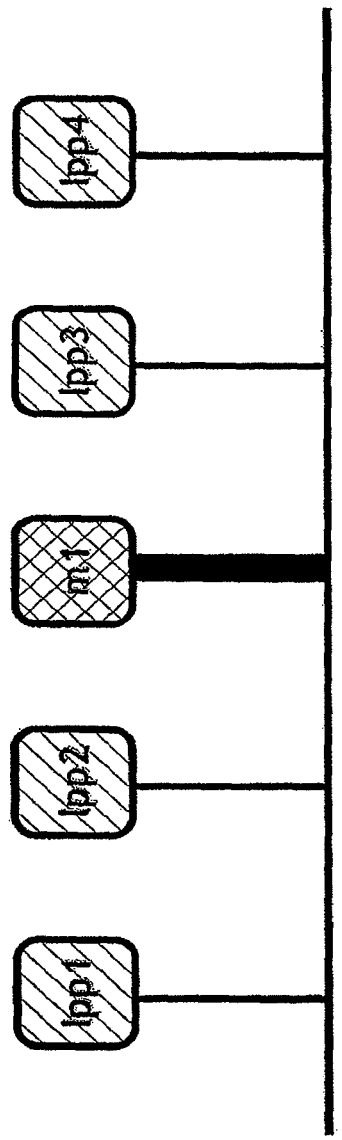
FIG. 1B is a schematic node diagram showing the physical architecture of the system in FIG. 1A.

On the other hand, in centrally mediated models, all messages are transmitted via a central mediation node (see FIGS. 1A and 1B). In the parlance of mediation networks, a mediation service is the general term applied to some computation that is applied to all incoming messages; the mediation requirement for any particular instance of a mediated architecture refers to the collation of all mediation services provided therein; a mediation authority is a person or persons providing such a mediation service; a mediation network is the network of physical computational entities (machines) under the control of the mediation authority; and a mediation server, the physical machine hosting one or more mediation services.

In a simplified model of a generalised mediated information flow system, messages sent to the mediation authority may belong to one of the following types: new information, emanating from a process acting as an information source; queries about state held by the mediation authority, requesting an immediate reply; and expressions of interest, essentially persistent queries requiring ongoing replies whenever pertinent new information is received by the mediation authority.

It is worth remarking that even in a fully mediated model, expressions of interest may still be significant, especially in the delivery of this network service to sinks, where they can reduce the bandwidth requirement on each virtual channel.

In the light of the above definitions, a mediated information flow system is one that consists of messages, containing information, being sent to and from a central authority. Actions taken by this authority may include time-ordered logging of received messages, computation over the sum of messages received up to a point, and dissemination of incoming messages among other clients, possibly after performing some processing based on the message content.

Figure 2A:
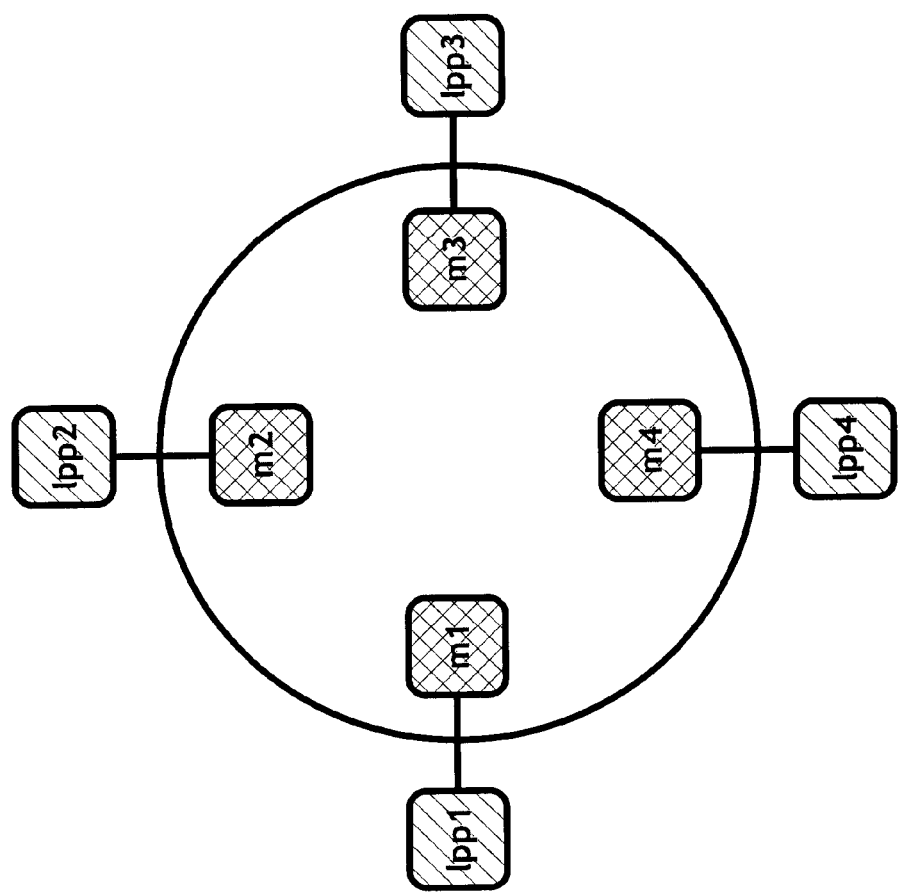
FIG. 2A is a node diagram showing a prior art mediated information flow system with a central network logical architecture.
Figure 2B:
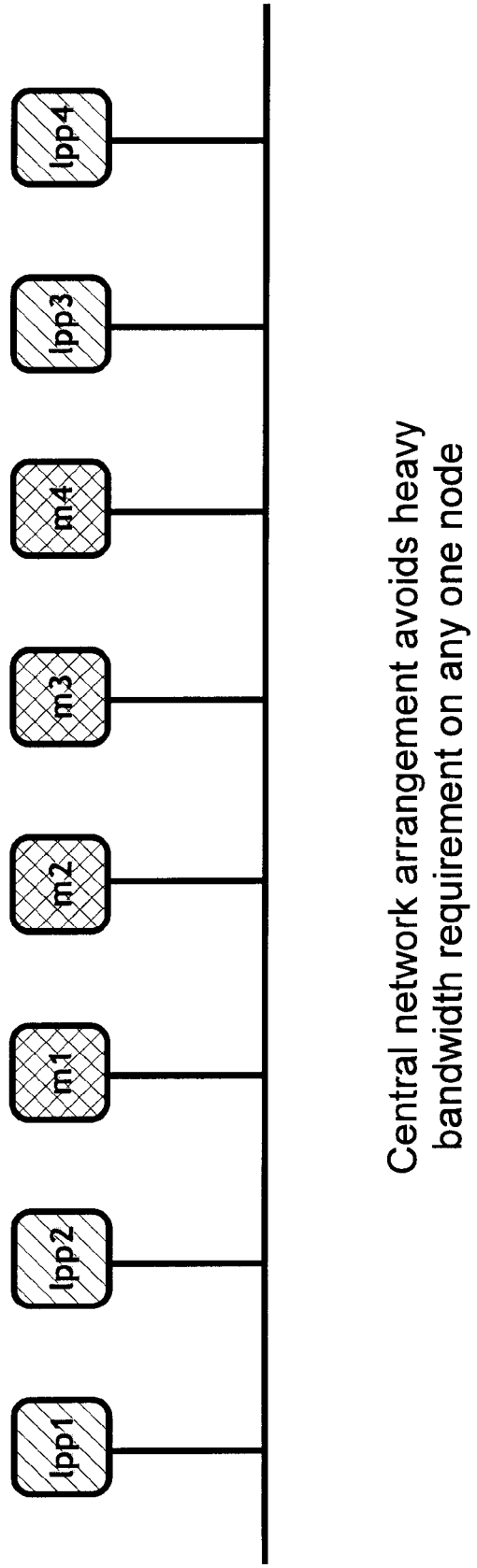
FIG. 2B is a schematic node diagram showing the physical architecture of the system in FIG. 2A.

The present invention represents a hybrid of the content-based, decentralised P2P model and the simple, centrally-mediated network model. Rather than provide a single, central mediator, the various mediation services are dispersed across a mediation network comprising a number of separate functional components. In the hybrid model, expressions of intent are used to open virtual channels between source nodes and mediator nodes, and expressions of interest are used to open virtual channels between the mediator nodes and sink nodes. Messages received by sink nodes are therefore governed by expressions of interest registered with the mediated service. The latency between source and sink nodes is necessarily greater than in simple content-based routing, as there are two or more logical hops involved. Provided the context allows it, the latency in each logical hop can be successively reduced as more static information becomes available. Relative to the simple mediated model, the mediation task is more complex, because it is spread over multiple nodes (see FIG. 2A). However, the inherent central bottleneck of the centrally mediated model has been removed and the resulting architecture is scalable.

Figure 3:
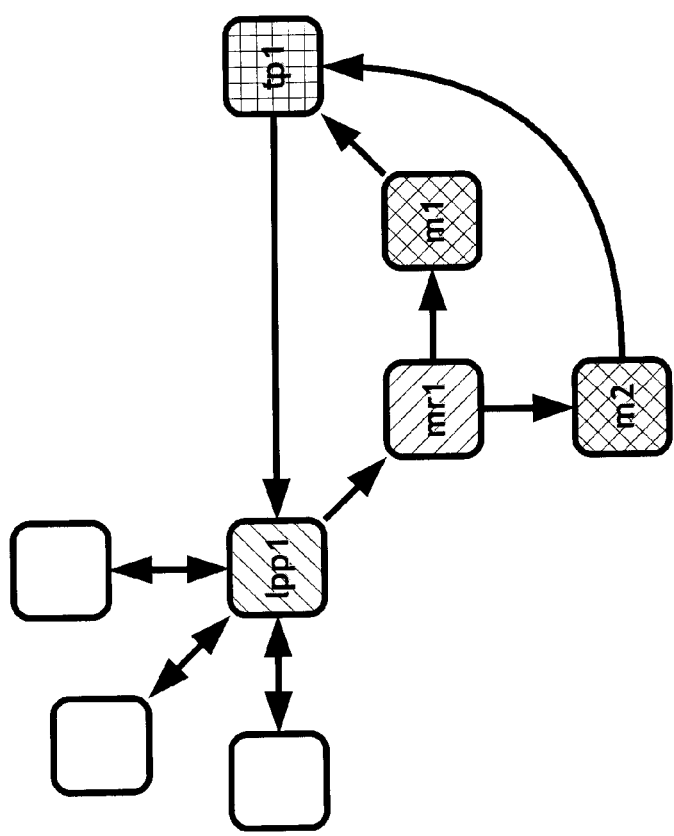
FIG. 3 shows a minimal node diagram showing the fundamental cycle (LPP→MR→M→TP→LPP) of which every effective distributed mediation network node is a part.

FIG. 3 shows a minimal topology that illustrates the functional components of a (hybrid) distributed mediation model that is in a "quiescent" or "steady state", i.e. a state in which there is no provision for changes in the logical topology. The Figure shows how data flows around the system among the various component nodes.

All the component nodes necessary for a distributed mediation network of unlimited scale are present in this minimal topology, including: sources, sinks, local points of presence, mediator routers, mediators and transmission proxies. Throughout the following discussion, these terms and others listed below take a definition as set out below:

Local Point of Presence (LPP): a local point of presence acts as an intermediary between clients (sources and sinks) and the rest of the distributed mediation network. Local points of presence are network nodes that provide proxies for mediation services for a particular geographical region. Each client of a mediation service will thus communicate with only a single local point of presence, and with no other nodes within the mediation architecture. There may be an arbitrary number of LPPs in a system, each serving a respective number of clients.

Mediation Router (MR): a mediation router is a network node, incorporating a mediation router module that analyses the content of incoming messages and routes them to one of a number of cross-stream mediator nodes. Each mediation router sits at the head of an upstream network and receives messages from a number of LPPs. A mediation router may also log incoming messages to allow, for example, a local service within the geographical area it serves.

Mediator (M): a mediator is a network node incorporating a mediator module, which services the mediation requirement. Each mediator has an associated downstream distribution, which is used to pass relevant messages to LPPs, and therefore, ultimately, to the sinks. Each mediator module implements one or more mediation tasks, each task representing a single mediation segment service to be applied to a particular type of message segment. Mediator modules may be configured to log all incoming messages they receive and to forward these messages to the associated downstream transmission network. Mediation tasks may then include servicing queries over message logs thus generated.

Transmission Proxy (TP): a transmission proxy is a network node, incorporating a transmission proxy module, that analyses messages output by one or more mediator nodes; determines, from registered expressions of interest, to which sink(s) the outgoing message is directed; and forwards messages on the downstream network associated with each mediator.

As explained in detail later in this description, the preferred embodiment of the present invention further comprises an autonomic control plane in addition to the network modules (nodes), thereby enabling autonomic control of the system.

The upstream network (from source to mediator router) is seen to be mediated but not content-based. Routing between mediator routers and mediators, in the so-called cross-stream, is content-based. The downstream network, too, requires content-based routing: indeed message routing between mediator routers and LPPs can be regarded as a hybrid content-based delivery mechanism in its own right. The partitioning of the message space as a part of this hybrid allows the introduction of a mid-stream mediation service to the publish and subscribe model without introducing a non-scalable central bottleneck.

For a "quiescent" or "steady state" system, the following statements relating to the distributed mediation network are always true. These statements may be considered "global invariants" of the distributed mediation architecture.

Every node is part of a cycle LPP→MR→M→TP→LPP
Every LPP addresses a single MR
Every MR may address any arbitrary M
Every M addresses a single TP
Every TP may address any arbitrary LPP The symbol "→" used above represents a unidirectional connection (a directed edge).

From inspection of the "global invariants" above, it is clear why the network illustrated in FIG. 3 is considered to be the minimal distributed mediation topology: it consists of one LPP, one MR, and one TP, with two Ms over which the mediation is distributed. The nodes are configured in a simple cycle, with unidirectional connections arranged therebetween: LPP→MR→M→TP→LPP.

Figure 4:
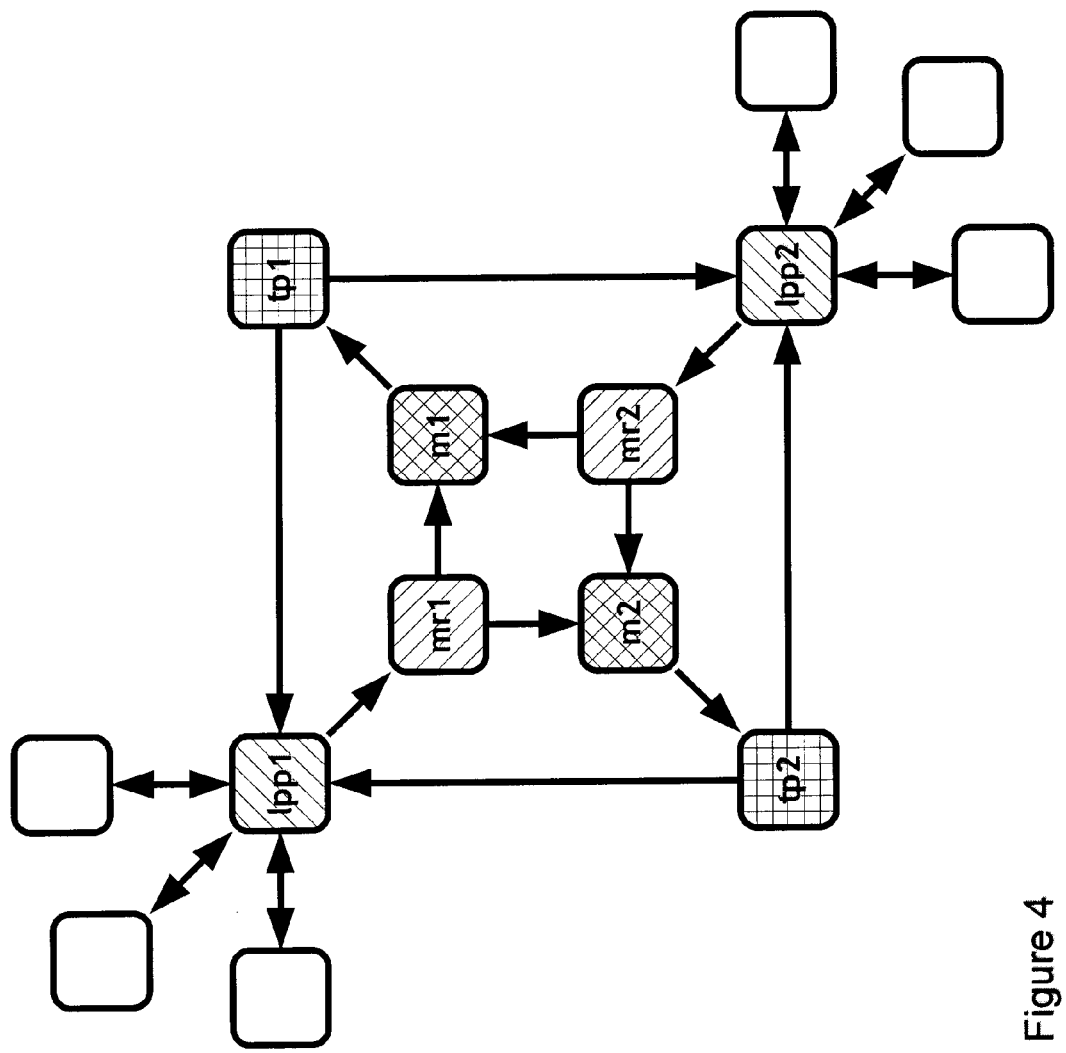
FIG. 4 is a node diagram showing a "cubic" distributed mediation model in accordance with the present invention.

A more realistic, and complex, distributed mediation network is illustrated in FIG. 4. Here, two of each type of node are present in a configuration known hereafter as a "cubic" network. The cubic network illustrates further properties of general distributed mediation networks.

As in the cyclic network, the message flow between connected nodes is unidirectional. Every node in the cubic network is a component of at least one cycle, LPP→MR→M→TP→LPP. The cubic network exhibits a "fan in/fan out" topology: while every LPP sends each message to precisely one MR, each MR may be addressed by a plurality of LPPs (two in FIG. 4)—fan-in; every MR is capable of sending a message to any mediator—fan-out; every mediator sends any given message to precisely one TP, while each TP may be addressed by a plurality of mediators—fan-in; and finally, every TP is capable of sending a message to any LPP—fan-out.

Distributed mediation networks such as the minimal cyclic and the cubic networks also display another important property: a directed path exists from every node to every other node in the network. In graph theoretical terms, every node is in the transitive closure of every other node. This property holds trivially for cyclic networks: it does however hold in more complex distributed mediation networks, as consequence of the global invariant properties. The directed path can always be considered as a directed cyclic graph. Thus for any two nodes A and B within a generalised distributed mediation network, a cycle exists from A to A which contains B. It is worth noting that in a cubic (single-level) network the maximum path length of such a cycle is 8, rather than 4.

Again, each node has no global dependency or any detailed knowledge of the network beyond its immediate neighbours. Each node stores identities only of those nodes it directly addresses. Nodes may also store information about the totality of nodes which address each node within the network; this may be stored either as a reference count in the node itself, or as a credit balance value in all nodes that directly address it. In either case the identities of the addressing nodes need not be stored. Indeed, no node need store any further information about the rest of the global system.

A further important property of the distributed mediation network of the present invention it that behaviour is deterministic and ordered within each node; that is, it is possible to ensure that a message B arriving after a message A is also dispatched after message A. Likewise, messages can not overtake on direct links between nodes; thus, for any two nodes N1 and N2 such that N2 is directly addressed by N1, then if a message A is sent to N2 by N1, and subsequently a message B is sent to N2 from N1, then N2 will receive message A before receiving message B.

Distributed Mediation Network Applications

An application A is structured according to a message oriented paradigm. A receives a partially ordered sequence of messages m1, m2, m3, . . . drawn from a set M, and responds by generating further messages. The observable behaviour of application A (denoted by obs(A)) is defined as the set of all possible output sequences derived from a particular input sequence.

For such an application to benefit from being hosted by the distributed mediation network, it must follow the following principles:
   the application must parallelise into a set of application components $\{A_i\}$, each of which operate independently, but where all of the resulting output messages may be interleaved arbitrarily such that the observable behaviour of $\{A_i\}$ is equal to the observable behaviour of A,
   the set M of all possible input messages must be partitioned into a set of message segments, $\{S_j\}$, according to a function segment: (M→S),
   a relation mediates: (S→A) exists between message segments and application components such that each segment maps to precisely one application component, and
   the observable behaviour of the sum of all application components $\Sigma A_i$ in response to a sequence of messages m1, m2, m3, . . . where each component $A_i$ is passed only those messages filtered from the input stream according to the functions mediates and segment, is precisely the same as the observable behaviour of A on receipt of the entire input stream.

Moreover, given the above constraints, to register with the load-balancing functionality offered by the distributed mediation network, two further side-effecting methods require to be added to instances of application components $A_i$:
   gainSegment(segDescriptor, data), and
   loseSegment(segDescriptor→data)
such that, for any two application components $A_1$ and $A_2$, and any segment s, $obs(A_1+A_2)$ in a context where mediates(s)=$A_2$ is equal to $obs(A_1$. gainSegment(s, d)+$A_2$.loseSegment(s)) in a context where mediates(s)=$A_1$, where d is the result returned by $A_2$.loseSegment(s).

The Autonomic Control Plane

The distributed mediation architecture of the present invention is designed to function autonomically. That is, the system will optimise itself towards current requirements without the need for user input or knowledge of this optimisation. In particular, an autonomic system will take steps to ensure that the load on the available components is distributed effectively, thereby avoiding unnecessary bottlenecks in the handling of data in the system.

Figure 5:
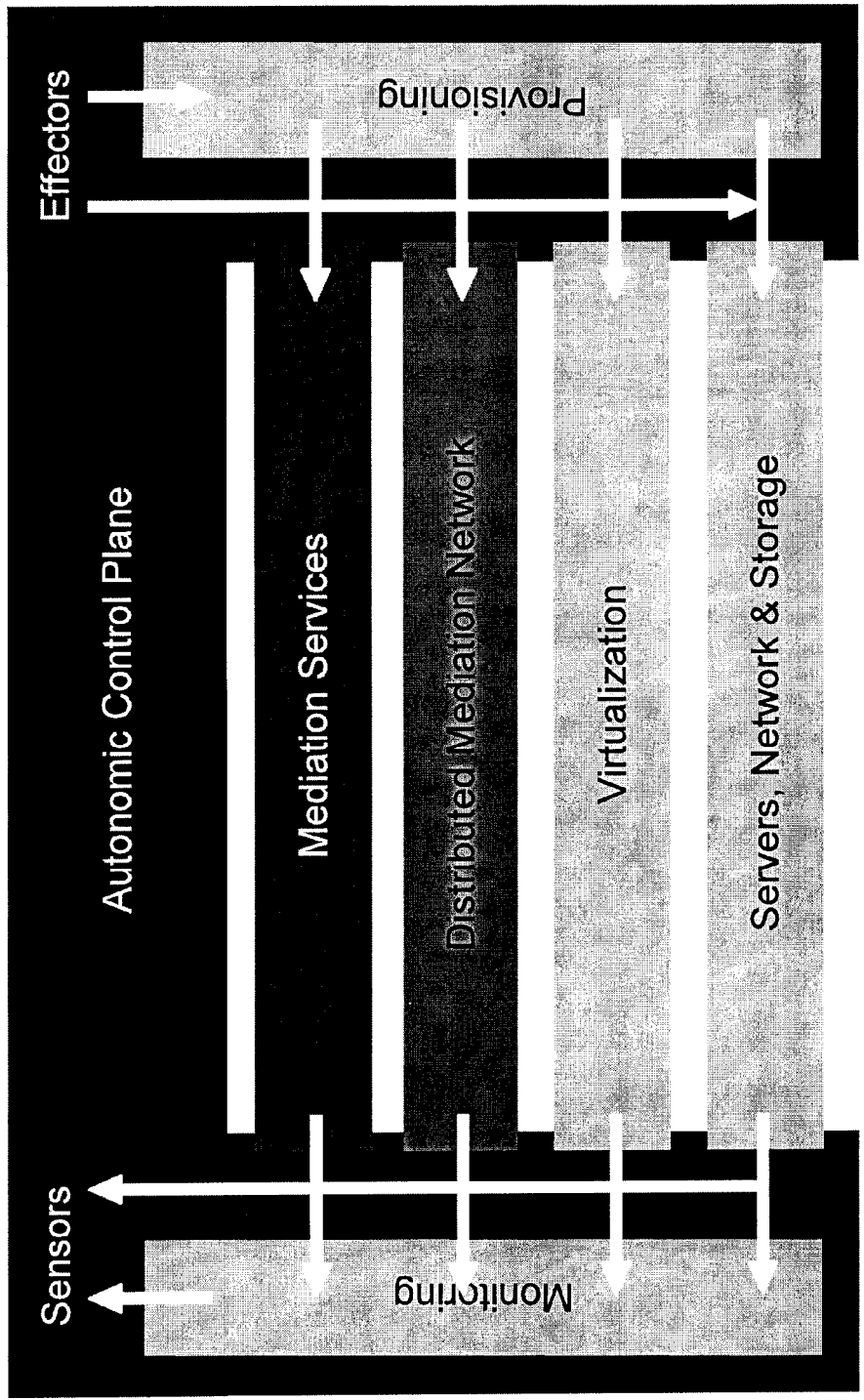
FIG. 5 illustrates the responsibilities of an autonomic control plane in accordance with the present invention.

In the present invention, autonomic functionality is provided by the presence of an autonomic control plane. As illustrated in FIG. 5, the autonomic control plane manages the mediation services, the distributed mediation network and the underlying resources (be they virtual or actual). Each network node presents itself as a managed element to the autonomic control plane. A managed element supports both a sensor and an effector interface. The sensor interface emits specified metrics, allowing the autonomic manager to monitor certain attributes of the managed element. The effector interface receives, from the autonomic manager, specified operations to change the behaviour of the managed element. As such, each of the sensor interface and the effector interface allows a unidirectional flow of information, the former functioning from managed element to autonomic manager, and the latter functioning from autonomic manager to managed element. In the preferred embodiment, the autonomic control plane consists of a hierarchical set of autonomic managers, as shown in FIG. 6.

Figure 6:
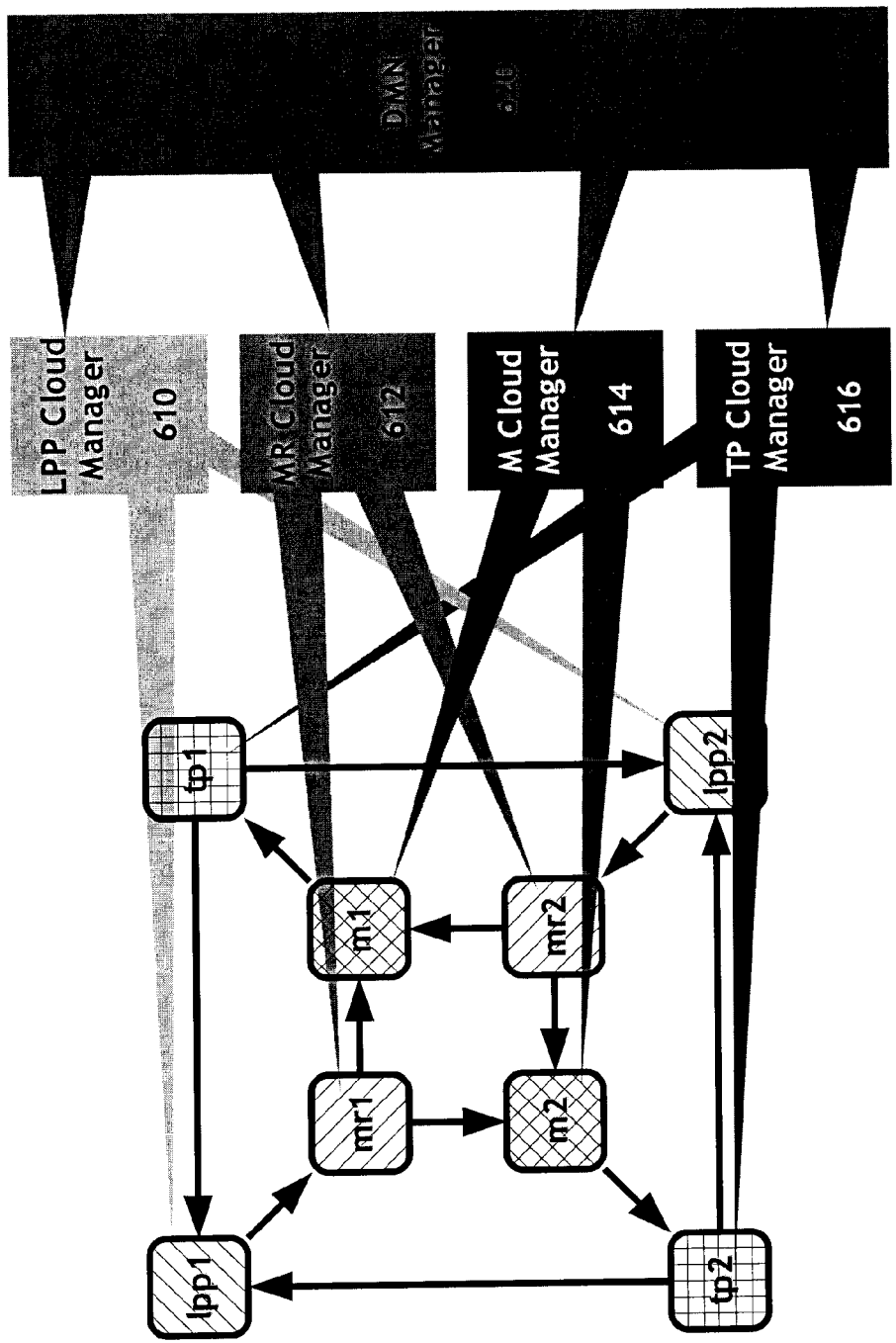
FIG. 6 illustrates the hierarchical structure of the autonomic control plane of the preferred embodiment of the present invention.

In the example shown in FIG. 6, there is a single autonomic manager for each type of network node (LPP, MR, M, and TP). Managers at this hierarchical level are referred to as cloud managers. Each cloud manager is responsible for a particular load balancing function. In a preferred embodiment, each cloud manager is itself distributed across a peerto-peer network, and receives the sensor events from each network module of the type for which it is responsible.

At the next hierarchical level, an overall distributed mediation network (DMN) manager 620 retains control of the cloud managers, ensuring that they act as a coherent unit. As such, the cloud managers present themselves as managed elements of the DMN manager 620. The DMN manager 620 is responsible for ensuring that the resources available to each cloud manager are sufficient to perform the relevant load-balancing task, while the cloud managers are responsible for relinquishing control of any resources that they do not currently require. The DMN manager 620 resolves any resource conflicts between the cloud managers.

In the example shown in FIG. 6, the MR cloud autonomic manger 612 is responsible for upstream load-balancing, that is for ensuring that no MR is overloaded with traffic. The MR cloud manager 612 is capable of increasing and decreasing the number of MRs in the network, and will do so such that the average throughput through the MRs is within a specified optimum range. Moreover, the MR cloud manager 612 will optimise the distribution of LPPs across the MRs such that no individual MR is overloaded. In the preferred embodiment, the actual instruction of a LPP to transfer is output from one MR to another is performed by the LPP cloud manager 610.

The M cloud autonomic manager 614 is responsible for cross-stream load-balancing. As such, the M cloud manager 614 ensures that there are sufficient Ms to handle the throughput routed through the MRs. To achieve this, the M cloud manager 614 will adjust the number of Ms such that the average load on each M module is within a specified range. The M cloud manager 614 is also responsible for distributing the mediation segment services amongst the Ms such that no individual M is overloaded. In order to do this under a range of conditions, the M cloud manager 614 is capable of transferring mediation segments or tasks between the Ms. The algorithm by which this is achieved is discussed in greater detail with respect to the example given below.

The TP cloud autonomic manager 616 is responsible for downstream load balancing. As such the TP cloud manager 616 ensures that the average throughput for each TP lies within a specified range, and that the Ms are distributed across the TPs such that no individual TP is overloaded. In the preferred embodiment, the actual switching of an M from one TP to another is delegated to the M cloud manager 614.

Although the load balancing policies enacted by the cloud managers follow the same basic pattern, it should be noted that switching a mediation segment service is a compound operation consisting of migrating the processing of the segment, including the transfer of any associated state; and updating the routing function used by each MR to determine the target of a given message, rerouting messages that are received by the old mediator in the meantime. It is for this reason that it is the actions of the M cloud manager that are discussed in more detail below.

In general, the load balancing policies should be allowed to operate independently with any resource conflicts resolved by a higher level service (the distributed mediation network manager). However, any switching initiated must be choreographed such that the causal delivery of messages from each client to the appropriate mediation segment service and the causal delivery of messages generated by each mediation service to interested clients are both guaranteed at all times.

Cross Stream Load-Balancing—Mediation Segment Service Handover

The distributed mediation architecture of the present invention is based on an arbitrary topology of nodes: LPP, MR, M and TP. This topology of nodes has the properties described above in relation to the "steady state". This same topology is eminently suitable for the dynamic balancing of loads amongst existing functional components.

As described above, whenever a particular segment is deemed to be under heavy load, the hosting of the associated mediation task (mediation segment service) may be autonomically moved (by the M cloud manager) to a machine within the network that has spare capacity. The handover of the mediation task also requires dynamic adjustment of the mediation network to ensure that any messages, either currently within the network, or to be received in the future, are diverted to the new mediator node. This may be achieved by the propagation of special messages around the new logical network topology, i.e. a "causal rippling" through the appropriate machines. Mediation change can thereby occur within a live system without affecting the observable behaviour of that system in terms of message input and output. Recall that the mediation segments or tasks together form a single mediation applications, and that the various segments are distributed across the Ms.

Mediation change is ultimately possible by virtue of the global invariant property whereby an incoming message will be routed to the same mediator regardless of the LPP from which it emanates. Mediation change poses the problem of changing from one consistent state to another, within a live system, and without adversely affecting the system's correctness or performance. Two main functions of the distributed mediation network must be considered: message propagation and querying, and in particular start-up queries.

As mentioned previously, the M cloud manager is responsible for the autonomic load balancing of mediation requirements. As such, it is capable of both introducing new Ms to the system (should sufficient resources be available) and distributing the segments amongst the Ms such that no individual M is overloaded.

Moreover, the M cloud manager is capable of handling the addition or subtraction of mediation segments from a given mediation service. For example, the M cloud manager is capable of identifying a suitable M on which to host a new mediation segment.

For example, consider a system in which ten clients, each generating 15 requests/second, are attached to each of two LPPs (hereinafter referred to as Ipp1 and Ipp2). Moreover, the requests are associated with three distinct segments (hereinafter s1, s2, and s3) in equal proportion. There is a total upstream traffic of 300 requests/second shared equally between Ipp1 and Ipp2. In turn this generates cross-stream traffic of 300 requests/second that is shared equally (in this simple example) between two MRs (mr1 and mr2) and shared equally between segments s1, s2, and s3 (at a rate of 100 requests/second for each segment).

As mentioned previously, the mediators handle traffic according to its segment. In this example, there are two mediators (hereinafter m1 and m2), each capable of handling 200 requests/second. As such, one possible scenario is that m1 mediates traffic of segment s1, while m2 mediates the remaining traffic (segments s2 and s3). Clearly, the resultant load on m1 will be 100 requests/second while that on m2 will be 200 requests/second.

In the simple example given here, the mediation service transmits the current state of the traffic on to the downstream network, and TP tp1 is associated with m1 while TP tp2 is associated with m2. As such, tp1 will be supplied with 100 updates/second while tp2 will be supplied with 200 updates/second. These will in turn be passed on to Ipp1 and Ipp2, each of which will receive 300 updates/second from tp1 and tp2 combined, representing the sum of the updates received by the clients in the system.

Consider a change in the conditions under which the system of the example above operates. For example, segment s2 becomes of more interest to the clients while interest in segment s1 declines, and this is reflected in a change in the number of requests associated with these segments from each client. For the purposes of illustration, assume that each client now transmits 3 requests/second associated with s1 and 7 requests/second associated with s2. The combined number of requests/second for s1 and s2 in the system remains the same (at 200) but there are now only 60 requests/second associated with s1, while there are 140 requests/second associated with s2. Accordingly, the load on m1 is now only 60 requests/second, while that on m2 has risen to 240 requests/second. However, as mentioned previously, m2 has a limited capacity of 200 requests/second.

Accordingly, the M cloud manager is required to autonomically act to rectify the situation so that neither m1 nor m2 is under a load greater than that which it is capable of handling. In this example, the M cloud manager may act to switch the handling of segment s3 from m2 to m1. Once this has been done the overall load on m1 and m2 will be 160 request/second and 140 requests/second respectively. Note that a transfer of s2 to m1 would also have left the load on the Ms within acceptable limits, though m1 would have had to function at maximum capacity.

The migration of a segment from one M to another must be handled in such a way as to maintain causal delivery and without the changes to the distributed mediation network being externally visible.

Consider the progression of states from a time in which the system is in a first consistent state PS1 to a new consistent state PS2. At time $t_0$, the process of changing to the new state PS2 commences. At some unknown time after this, $t_1$, the system is known to have changed to the new consistent state PS2. The time $t_b$ when the actual change occurs is unknown but bounded by $t_0$ and $t_1$.

Between time $t_0$ and $t_1$ we define the system as being unstable, meaning that the currently operative apportionment of mediation tasks is not known globally. Each of the system functions however is unaffected, as at each point sufficient local knowledge is available to correctly handle the information flow.

Consider the example above, in which mediator m1 initially mediates segment s1 and mediator m2 while initially mediates segments s2 and s3. We now describe in detail the algorithm which permits the hot migration or handover of mediation services for segment s3 from m2 to m1 in order to load balance the mediation of all three segments (s1, s2, and s3), without interrupting the mediation service from the user perspective.

Figure 7A:
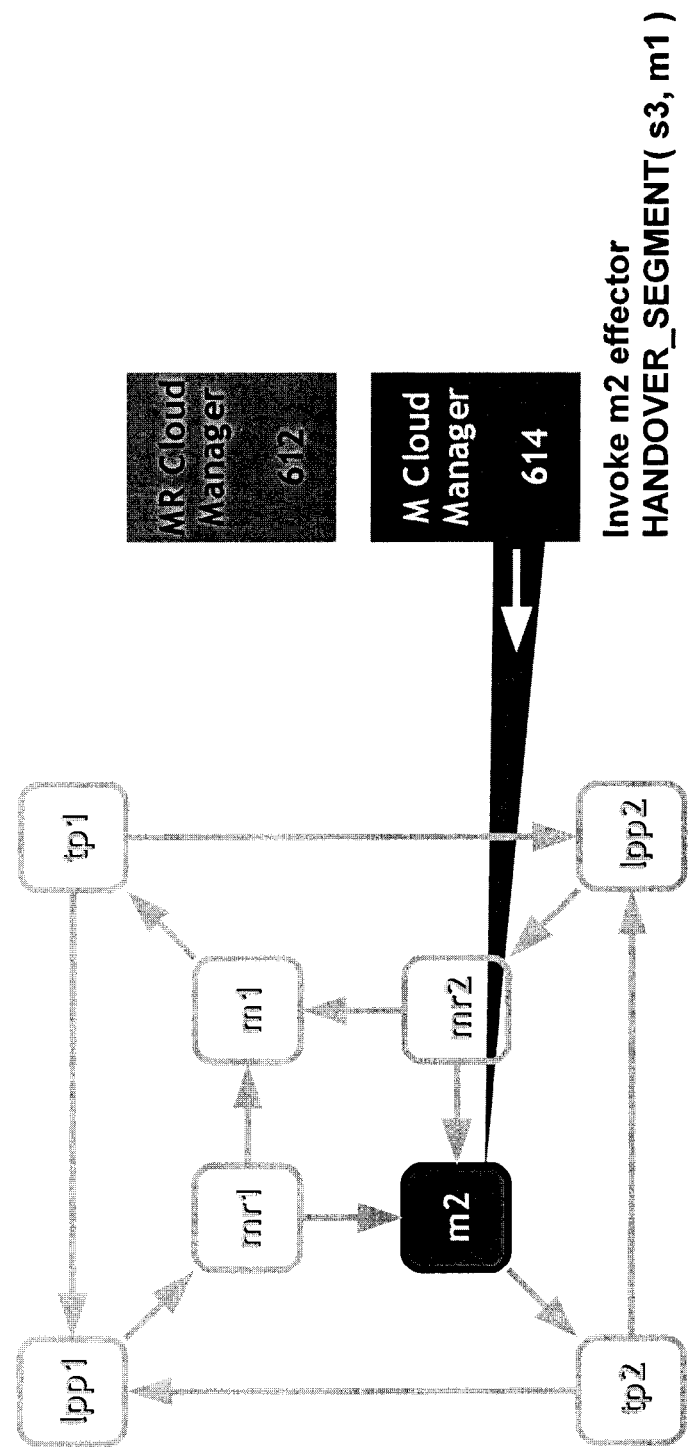
FIGS. 7A to 7F show the steps of handing a mediation task over from a sending mediator module m2 to a recipient mediator node m1 in the "cubic" distributed mediation architecture.
Figure 7B:
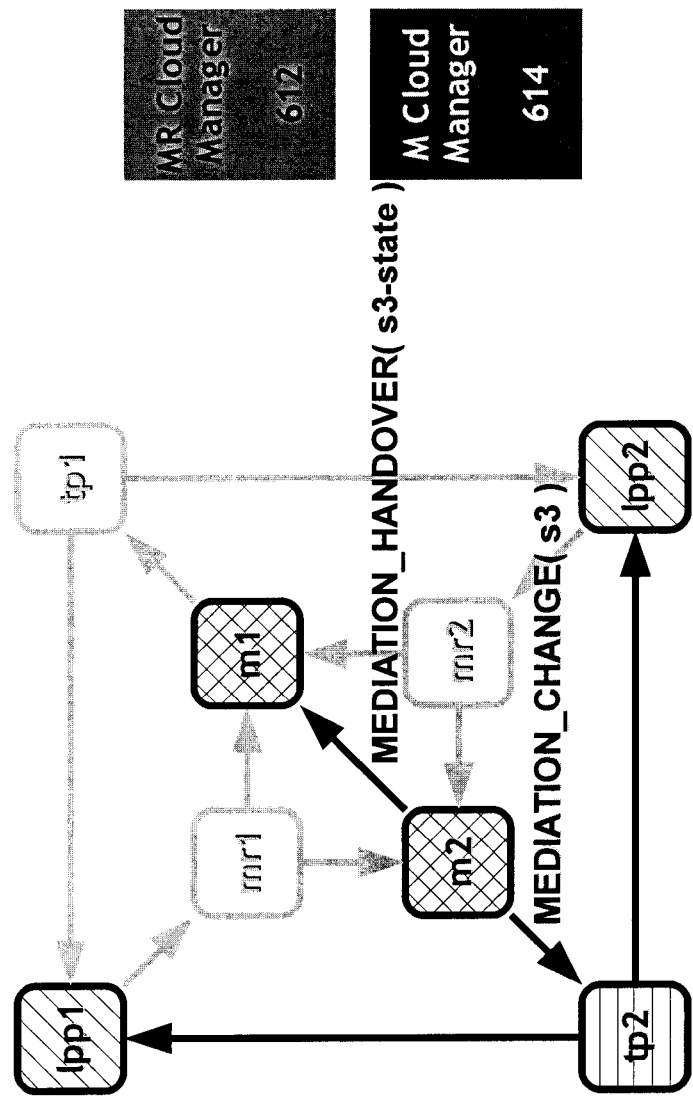

FIGS. 7A to 7F illustrate the mediation change cycle. As shown in FIG. 7A, the mediation change cycle is initiated by the M Cloud manager calling a HANDOVER_SEGMENT (s3) effector method on mediator m2 instructing it to hand over segment s3 to m1. As a result, m2 enters the HANDOVER_SENDER(s3) state. In this state m2 processes any buffered messages for s3. As shown in FIG. 7B, once the s3 buffer has been flushed it sends a downstream MEDIATION_CHANGE(s3) control message to all LPPs via its TP; and a serialized snapshot of its current state to m1 in a MEDIATION_HANDOVER(s3-state) control message. From this point, m2 ceases to mediate segment s3 and any subsequent messages for s3 are forwarded to mediator m1 by m2.

Figure 7C:
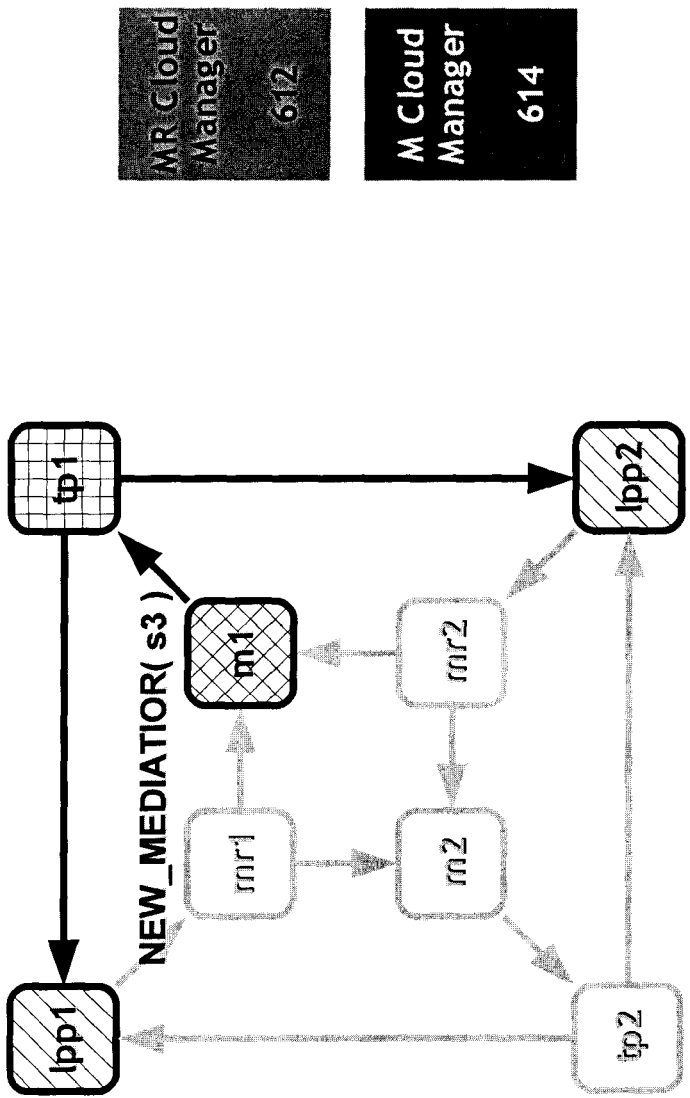

When mediator m1 receives the MEDIATION_HANDOVER(s3-state) control message, it enters the HANDOVER_RECEIVER(s3) state and initialises a mediation service for segment s3 using the state information received. Next, as shown in FIG. 7C, m1 sends a downstream NEW_MEDIATOR(s3) control message to all LPPs via its TP.

The NEW_MEDIATOR(s3) and MEDIATION_CHANGE(s3) control messages are used to ensure the causal delivery to clients of the output of the mediation task associated with segment s3. In particular, downstream messages from the old mediator (m2) must be delivered to clients before those from the new mediator (m1). To ensure this, s3 messages received by an LPP from the new mediator are buffered if the NEW_MEDIATOR(s3) control message is received before its corresponding MEDIATION_CHANGE(s3) control message.

Similarly, on entering the HANDOVER_RECEIVER(s3) state, mediator m1 immediately begins buffering any s3 messages received direct from each MR until it is certain that there are no outstanding s3 messages originating from that particular MR being re-routed from m2.

To establish this requires further interaction with the M Cloud manager via the control plane. Therefore, on entering the HANDOVER_RECEIVER(s3) state mediator m1 signals this state change to the M Cloud manager by emitting a sensor event.

Figure 7D:
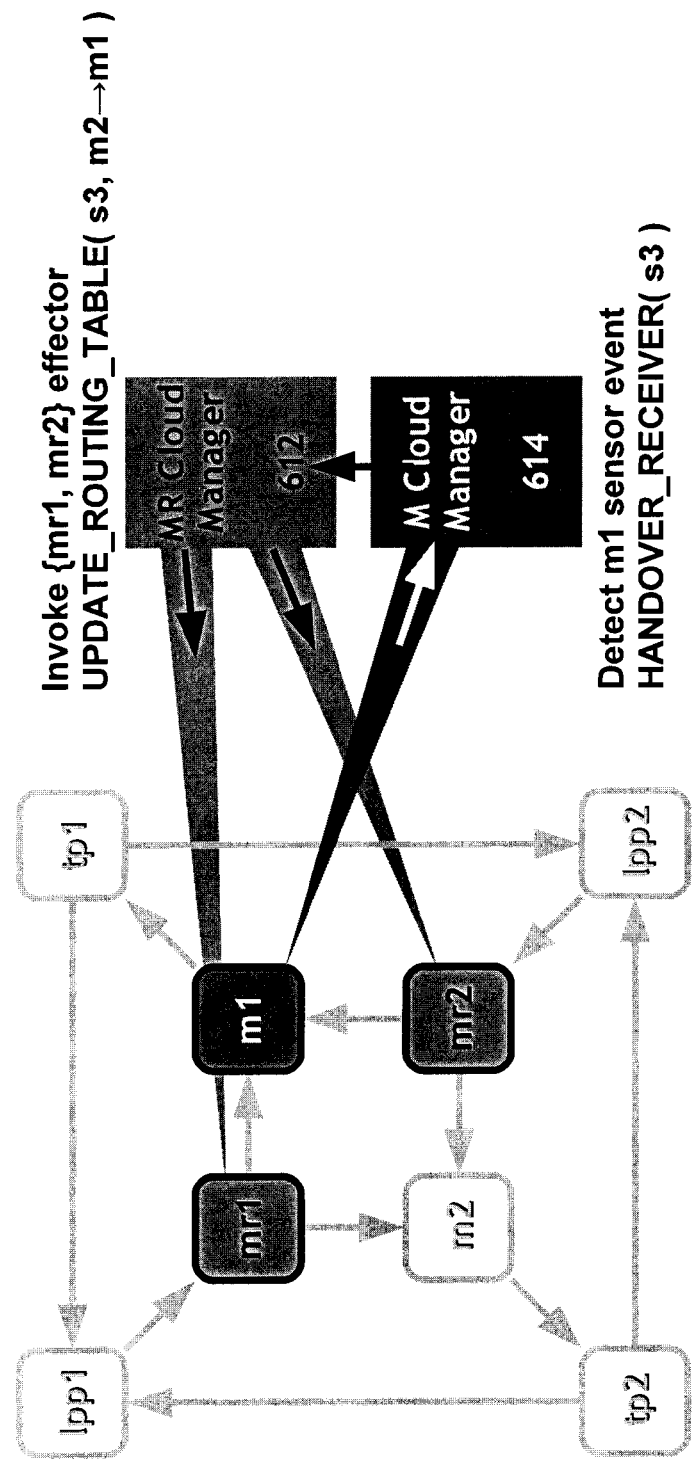

As shown in FIG. 7D, when the M Cloud manager receives this event it calls an effector on the MR Cloud manager to instruct it to update the routing table for each of its MRs. The MR Cloud manager sends each MR an UPDATE_ROUTING_TABLE (s3, m2→m1) control message. Although in this case the M Cloud manager communicates with the MR Cloud manager directly, in other embodiments the communication may happen in other ways. For example, in a more strictly hierarchical embodiment, the communication may be passed through the DMN manager (for example, the M cloud manager may issue a sensor event picked up by the DMN manager which then calls an effector method on the MR Cloud manager). In some embodiments, it may be impossible to communicate directly between Cloud managers. In general, it is contemplated that communication between cloud managers may occur both directly and through the DMN manager in all cases in which such communication is discussed hereinafter.

Figure 7E:
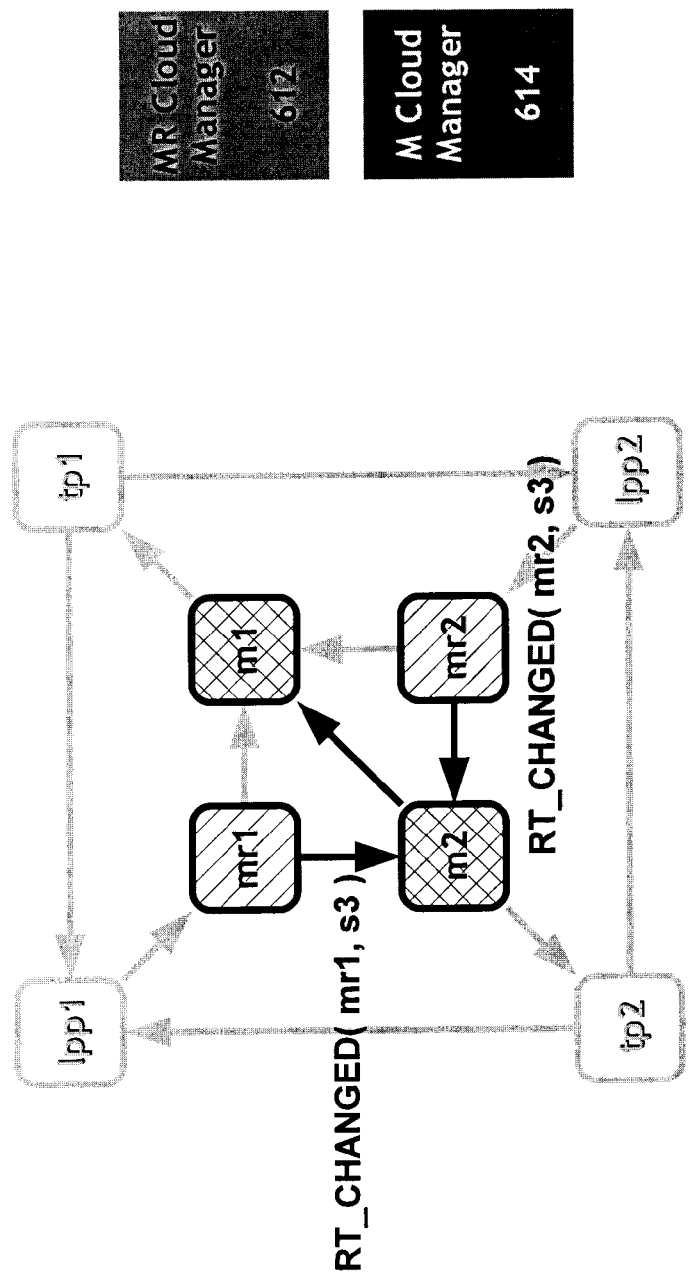

Once an MR has updated its routing table it sends a RT_CHANGED(MR-id, s3) control message to m2 and routes all subsequent s3 messages to m1. As shown in FIG. 7E, this RT_CHANGED control message is forwarded from m2 to m1 which is the trigger for m1 to flush any buffered messages for s3 received direct from this particular MR. Once any buffered messages have been flushed, m1 also emits a RT_CHANGED sensor event which alerts the MR cloud manager via the control plane that this particular MR has been updated successfully.

Figure 7F:
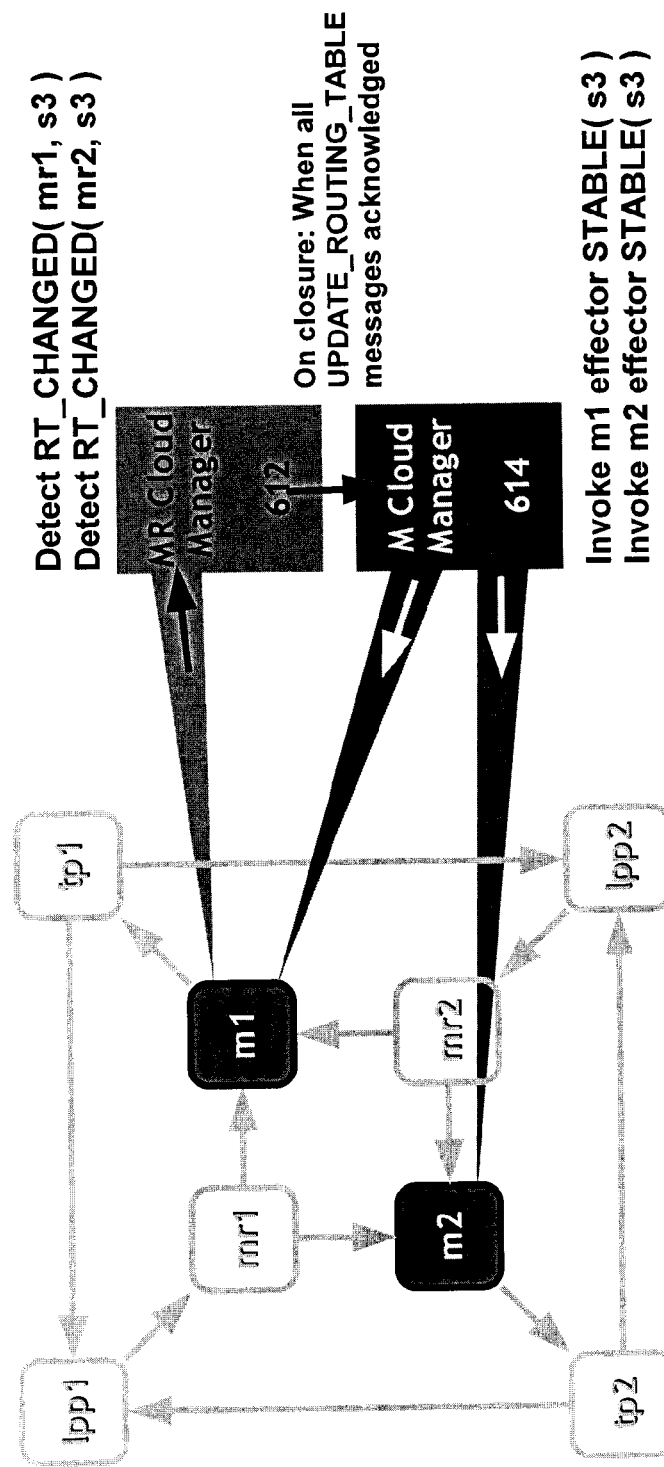

When the MR cloud manager has received acknowledgements via the new mediator m1 from all of the MRs, the mediation change process is effectively complete. As shown in FIG. 7F, at this time the MR cloud manager can inform the M Cloud manager via the control plane that it has updated all its MRs and the M Cloud manager can inform m1 and m2 that mediation change for s3 is complete at which point they can both revert to STABLE(s3) state.

Cross Stream Scale-Out and Scale-Back

Figure 8:
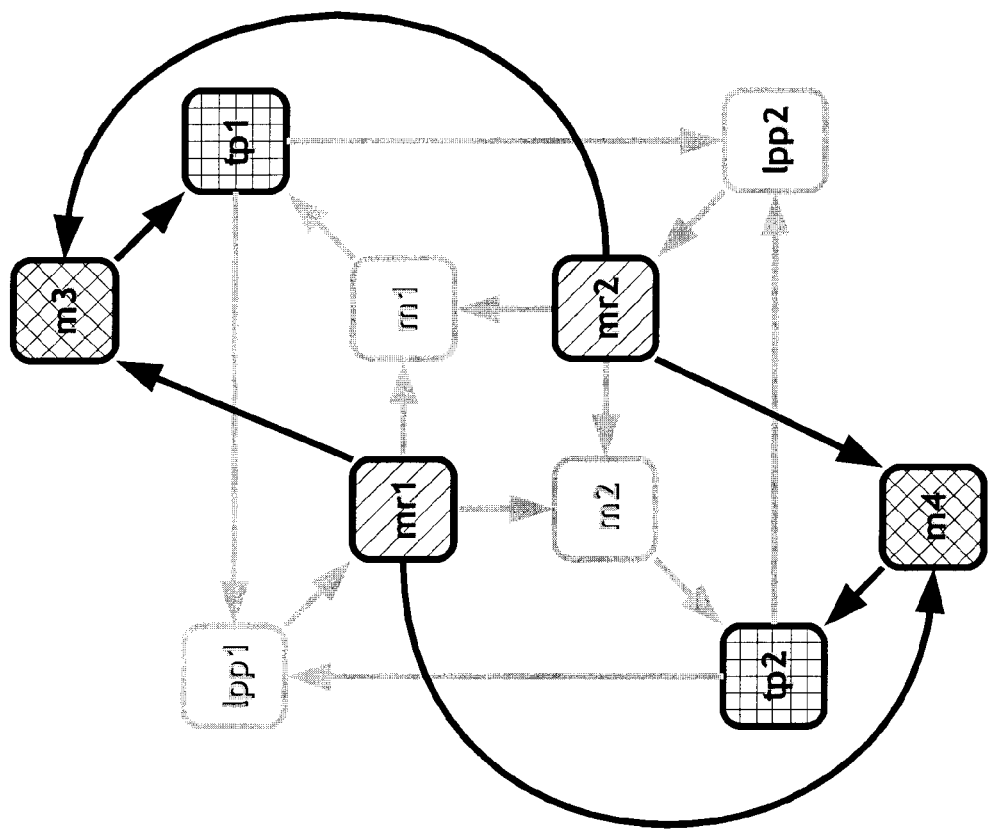
FIG. 8 illustrates the addition of mediator node to the "cubic" distributed mediation model in FIG. 4.

As would be clear to one skilled in the art, similar techniques can be utilised to add or remove M nodes from the system on demand. In the case of addition this is achieved simply by obtaining the resources required; creating an empty M node and connecting it to a TP; then adding segments to it over time. The result of adding two M modes to the "cubic" distributed mediation model is illustrated in FIG. 8. In the case of removal, this is achieved by first migrating all segments to other M nodes; then disconnecting it from its TP; shutting it down and releasing resources associated with it.

Upstream Load-Balancing—Switching Mediation Router

Figure 9:
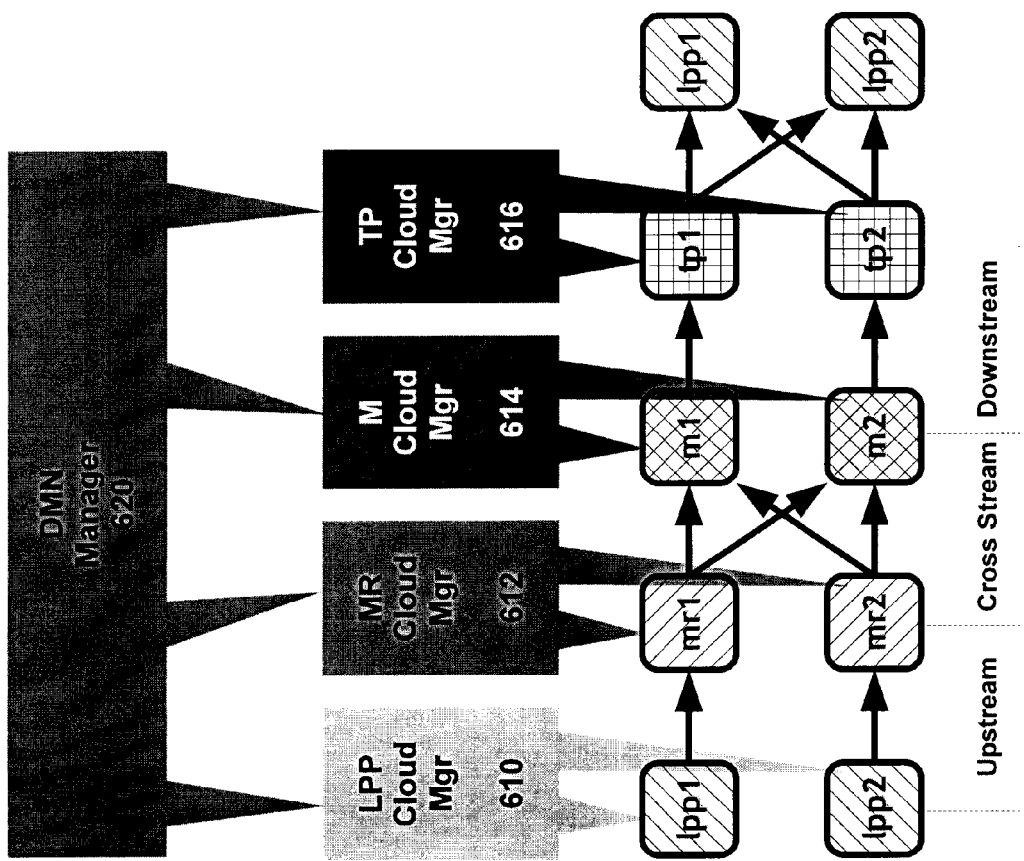
FIG. 9 is a node diagram that is topologically equivalent to the "cubic" distributed mediation model in FIG. 4. Using this so-called "cylindrical" layout it is easier to discuss other changes to an arbitrary distributed mediation network.

FIG. 9 shows an alternative illustration of a distributed mediation network. The network shown in FIG. 9 is topologically equivalent to the "cubic" network shown in FIG. 4, though the layout adopted in this case is referred to hereinafter as a "cylindrical" layout. Each LPP is illustrated twice in this type of diagram, both at the start and end of the illustrated network transmission paths. The cylindrical layout provides an effective illustration of the opportunities for load balancing that exist within the distributed mediation network.

As described above, cross-stream load balancing ensures the load on each mediator node stays within an acceptable range. As such, the goal is to ensure that the traffic through any given mediator node is within appropriate high/low watermarks and the overall workload handled by the set of mediator nodes is also within acceptable high/low watermarks. Since the level of traffic is determined by the distribution of mediation segment services across the mediator nodes, a technique is provided to migrate or handover a mediation segment service from one mediator node to another.

The upstream load-balancing case can be summarized as follows: the goal is to ensure that the traffic through any given MR node is within appropriate high/low watermarks and the overall workload handled by the set of MR nodes is also within acceptable high/low watermarks. Since the traffic through any given MR node is determined by the throughput generated by the LPP nodes attached to it, the ability to switch the output of an LPP node from one MR node to another is key to the management of load on any given MR. The ability to switch LPPs between MRs allows an MR to service multiple LPPs when traffic is light. This provides significant efficiency advantages over rigid systems where, for example, a dedicated MR is always allocated to each LPP.

Figure 10A:
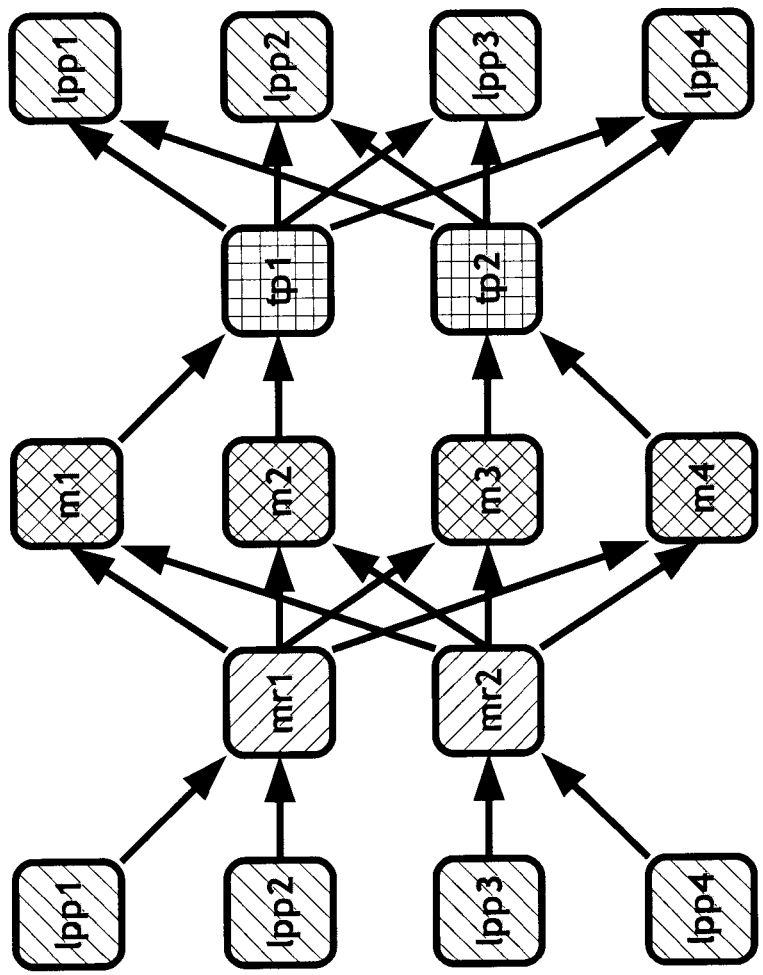
FIGS. 10A to 10E show the steps of switching an LPP node so that it is associated with a new MR node, given a starting point where at least two LPP nodes are sharing an MR node.

FIG. 10A shows an expanded cylindrical layout, consisting of 4 LPPs serviced by 2 MRs and 4 Ms serviced by 2 TPs. The arrows between the nodes in FIG. 10A represent the initial flow of network traffic. Taking this as the starting point, we consider the case where Ipp1 starts generating significant throughput such that mr1 risks being overloaded. We now describe in detail the algorithm which permits the hot switching of Ipp2 to mr2 to load balance the upstream traffic through the two MR nodes.

Figure 10B:
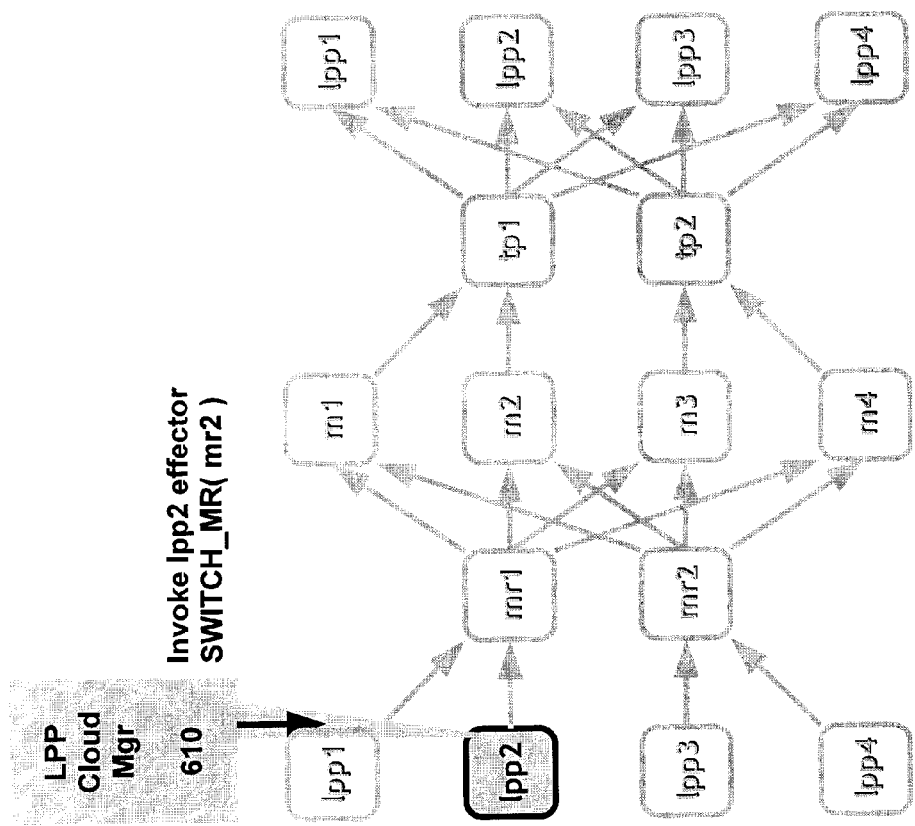

FIGS. 10B to 10E illustrate the LPP switchover cycle. As shown in FIG. 10B, the switchover cycle is initiated by the LPP Cloud manager calling a SWITCH_MR(mr2) effector method on node Ipp2 instructing it to switch from its current MR node mr1 to mr2. At this point LPP node Ipp2 enters into the SWITCHOVER(mr2) state.

Figure 10C:
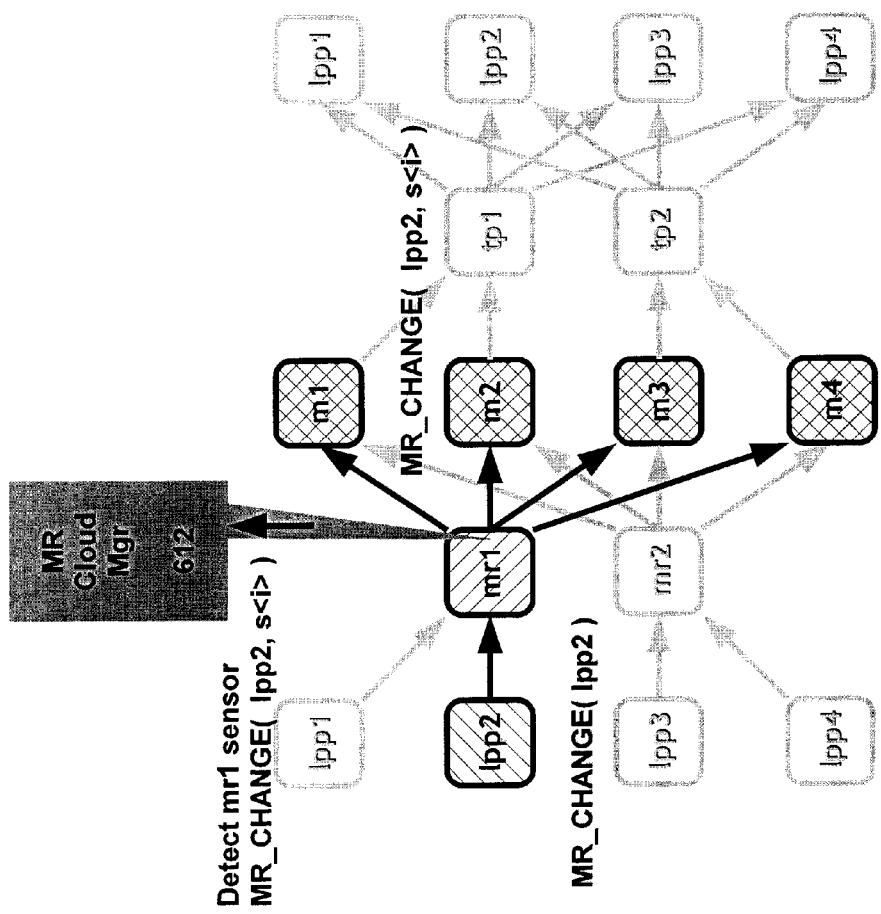

As shown in FIG. 10C, Ipp2 responds by sending MR_CHANGE(Ipp2) control message to mr1 which responds by sending an MR_CHANGE(Ipp2, s<i>) control message to the appropriate mediator for each segment s<i> in its routing table and simultaneously emitting an MR_CHANGE(Ipp2, s<i>) sensor event which is detected by the MR Cloud manager and stored in a shared data space accessible to the M Cloud manager. In some alternative embodiments, each LPP may maintain a list of "active" segments and generate MR_CHANGE(Ipp2, s<i>) control messages for these which are routed by mr1. However, such a variation requires the maintenance of state information at the LPPs that is not otherwise required.

Figure 10D:
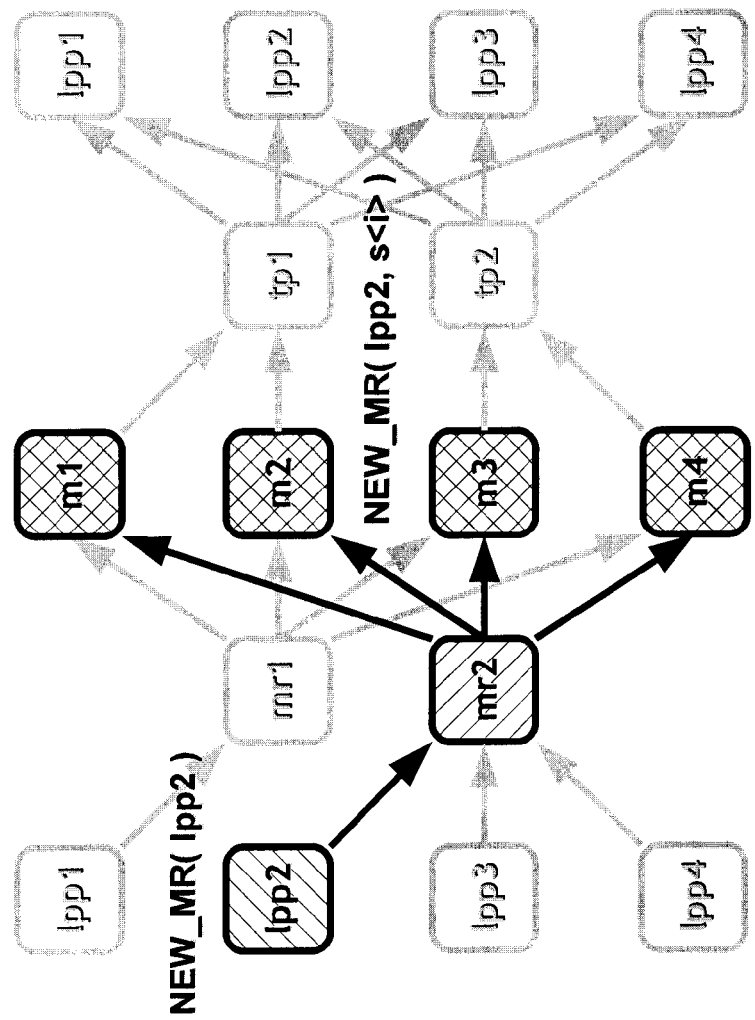

As shown in FIG. 10D, Ipp2 then switches to the new MR node mr2 and sends it a NEW_MR(Ipp2) control message. As above this results in the generation of NEW_MR(Ipp2, s<i>) control messages for each segment s<i> in its routing table which are transmitted to the appropriate M nodes.

The NEW_MR(Ipp2, s<i>) and MR_CHANGE(Ipp2, s<i>) control messages received by the M nodes are used to ensure the causal processing of cross stream messages by the appropriate segment service. In particular, upstream messages sent by Ipp2 via the old mediation router (mr1) must be processed before those sent via the new mediation router (mr2).

To ensure this, any s<i> messages originating at Ipp2 received by a mediator from the new mediation router are buffered if the NEW_MR(Ipp2, s<i>) control message is received before its corresponding MR_CHANGE(Ipp2, s<i>) control message. This buffering process in analogous to that undergone by the new mediator (m2) in the cross-stream load balancing described above, though in the case of upstream load balancing the buffering is keyed off the originating LPP whereas for cross-stream load balancing the buffering is keyed off the originating MR.

Figure 10E:
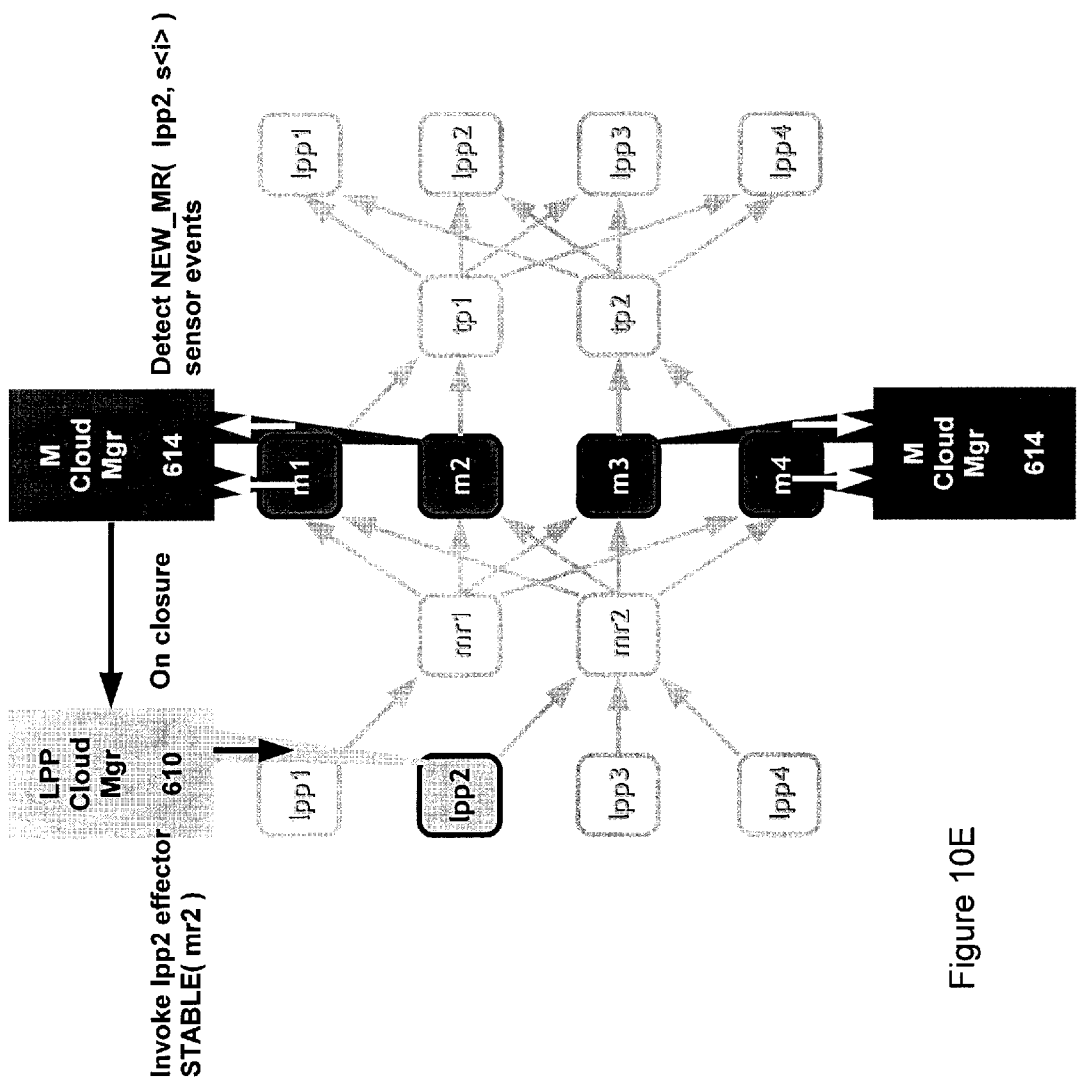

As shown in FIG. 10E, once both control messages have been received and any buffer flushed an NEW_MR(Ipp2, s<i>) sensor event is emitted by the M nodes involved and detected by the M Cloud manager. Once all the NEW_MR sensor events corresponding to the previously stored MRCHANGE sensor events have been detected, the M Cloud manager informs the LPP Cloud manager that the switchover cycle is complete and the LPP Cloud manager in turn invokes an effector method on Ipp2 switching it to STABLE(mr2) state.

In order to ensure optimum stability, it is envisaged that some embodiments of the present invention would enable communication between the LPP Cloud manager and the M Cloud manager to ensure that the switchover of LPPs between MRs would only be initiated when all Ms were in a STABLE state and that no segment handovers between Ms would be initiated while an LPP is in a SWITCHOVER state.

Downstream Load-Balancing—Switching Transmission Proxy

The downstream load-balancing case mirrors the upstream case above and can be summarized as follows: the goal is to ensure that the traffic through any given TP node is within appropriate high/low watermarks and the overall workload handled by the set of TP nodes is also within acceptable high/low watermarks. Since the traffic through any given TP node is determined by the throughput generated by the M nodes attached to it, the ability to switch an M node from one TP node to another is key. The ability to switch Ms between TPs allows a TP to service multiple Ms when traffic is light. This provides significant efficiency advantages over rigid systems where, for example, a dedicated TP is always allocated to each M.

Taking as our starting point the distributed mediation network described in relation to upstream load balancing above (shown in FIG. 10A), we consider the case where m1 starts generating significant throughput such that tp1 risks being overloaded. We now describe in detail the algorithm which permits the hot switching of m2 to tp2 to load balance the downstream traffic through the two TP nodes.

Figure 11A:
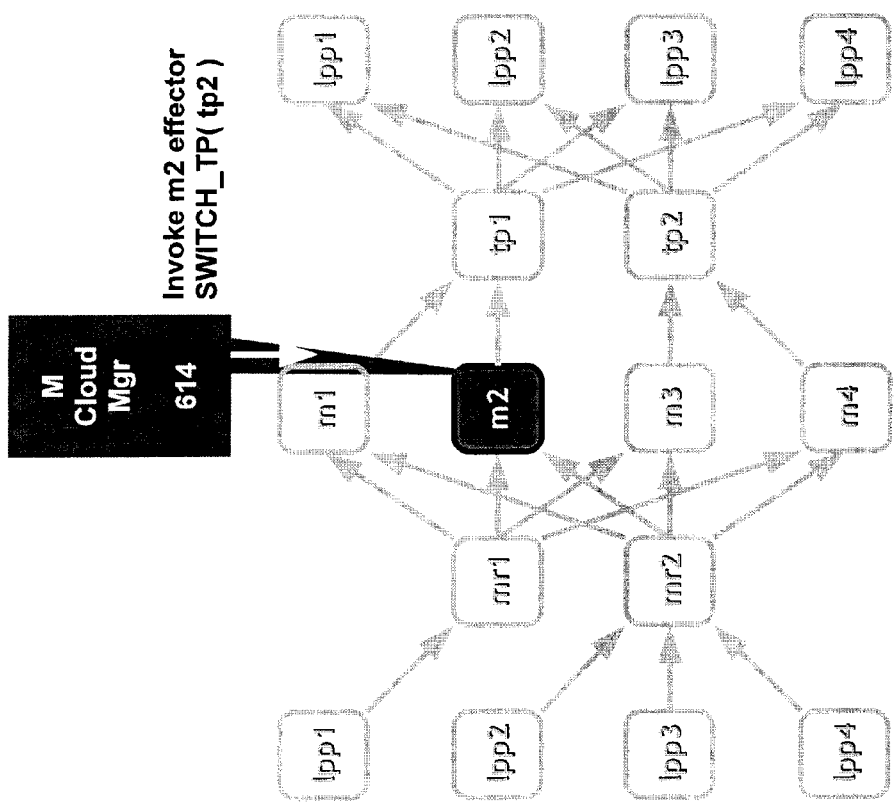
FIGS. 11A to 11D show the steps of switching a mediator node so that it is associated with a new TP node.

FIGS. 11A to 11D illustrate the mediator node switchover cycle. As shown in FIG. 11A, this switchover cycle is initiated by the M Cloud manager calling a SWITCH_TP(tp2) effector method on mediator m2 instructing it to switch from its current TP node tp1 to tp2. At this point m2 enters into the SWITCHOVER(tp2) state.

Figure 11B:
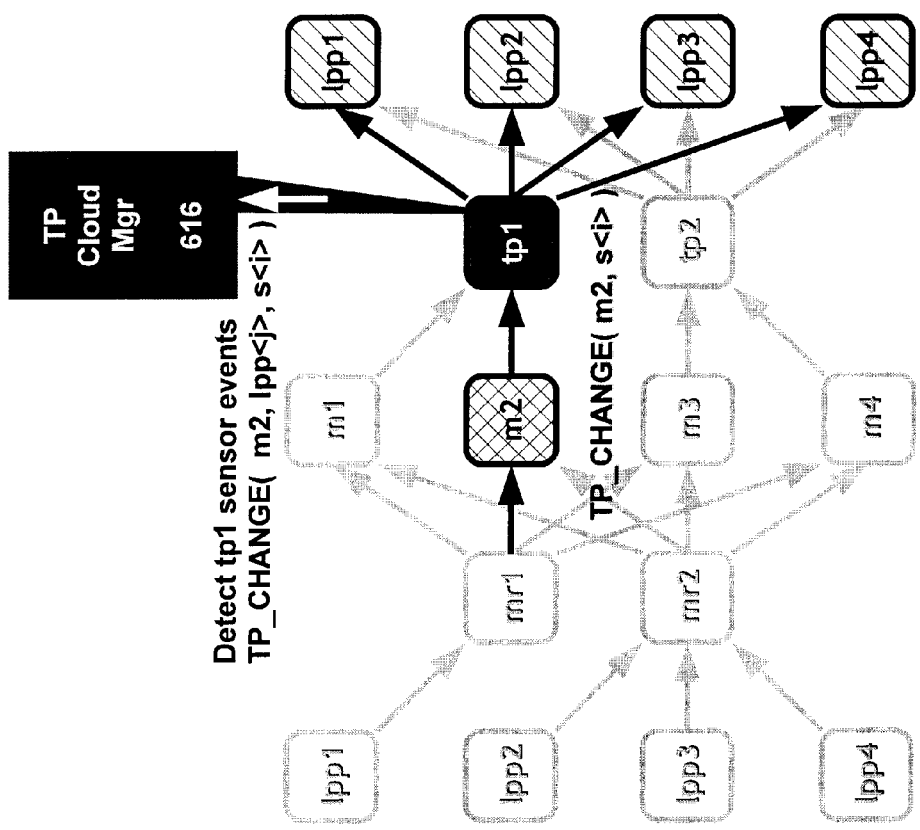

As shown in FIG. 11B, m2 responds by sending a TP_CHANGE(m2, s<i>) control message to tp1 for each active segment s<i> it is hosting. Node tp1 multicasts this message to all LPPs simultaneously emitting a TP_CHANGE (m2, lpp<j>, s<i>) sensor event corresponding to each LPP which is detected by the TP Cloud manager and stored in a shared data space accessible to the LPP Cloud manager.

Figure 11C:
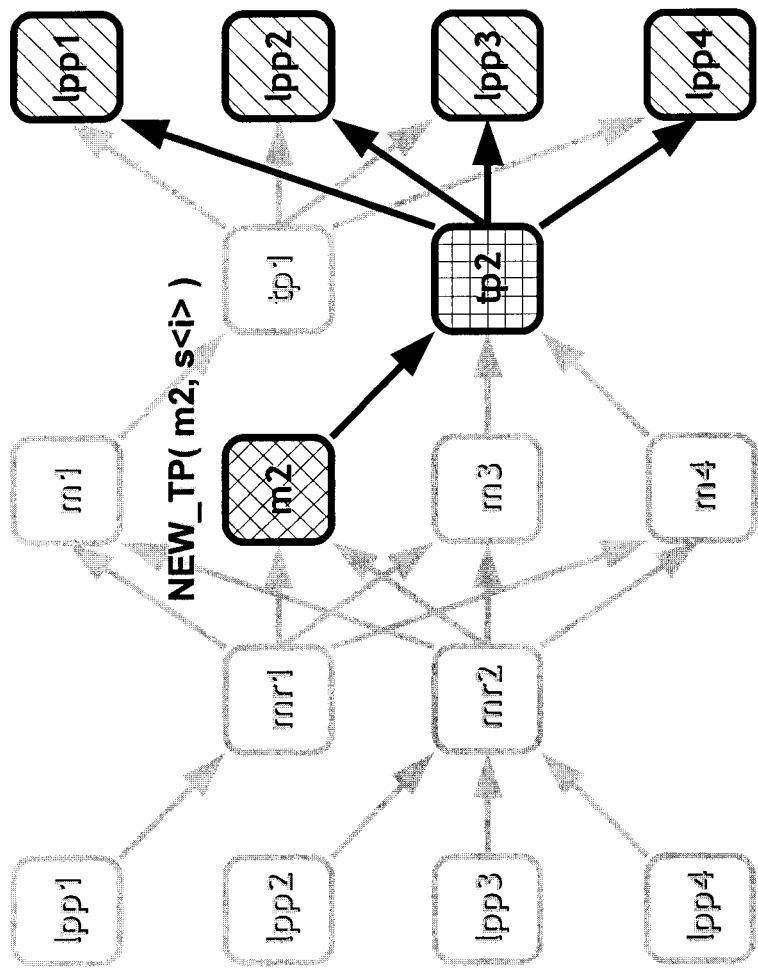

As shown in FIG. 11C, m2 then switches to the new TP node tp2 and sends it a NEW_TP(m2, s<i>) control message for each active segment s<i> it is hosting. Node tp2 multicasts this message to all LPPs.

The NEW_TP(m2, s<i>) and TP_CHANGE(m2, s<i>) control messages are used to ensure the causal delivery of downstream messages generated by the appropriate segment service. In particular downstream messages sent by m2 via the old transmission proxy (tp1) must be delivered before those sent via the new transmission proxy (tp2).

To ensure this, any s<i> messages originating at m2 received by an LPP from the new transmission proxy are buffered if the NEW_TP(m2, s<i>) control message is received before its corresponding TP_CHANGE(m2, s<i>) control message. [Note: This buffering is similar to that done by the LPP during segment handover except that in the former case the buffering is keyed off the originating mediation node rather than the originating transmission proxy.]

Figure 11D:
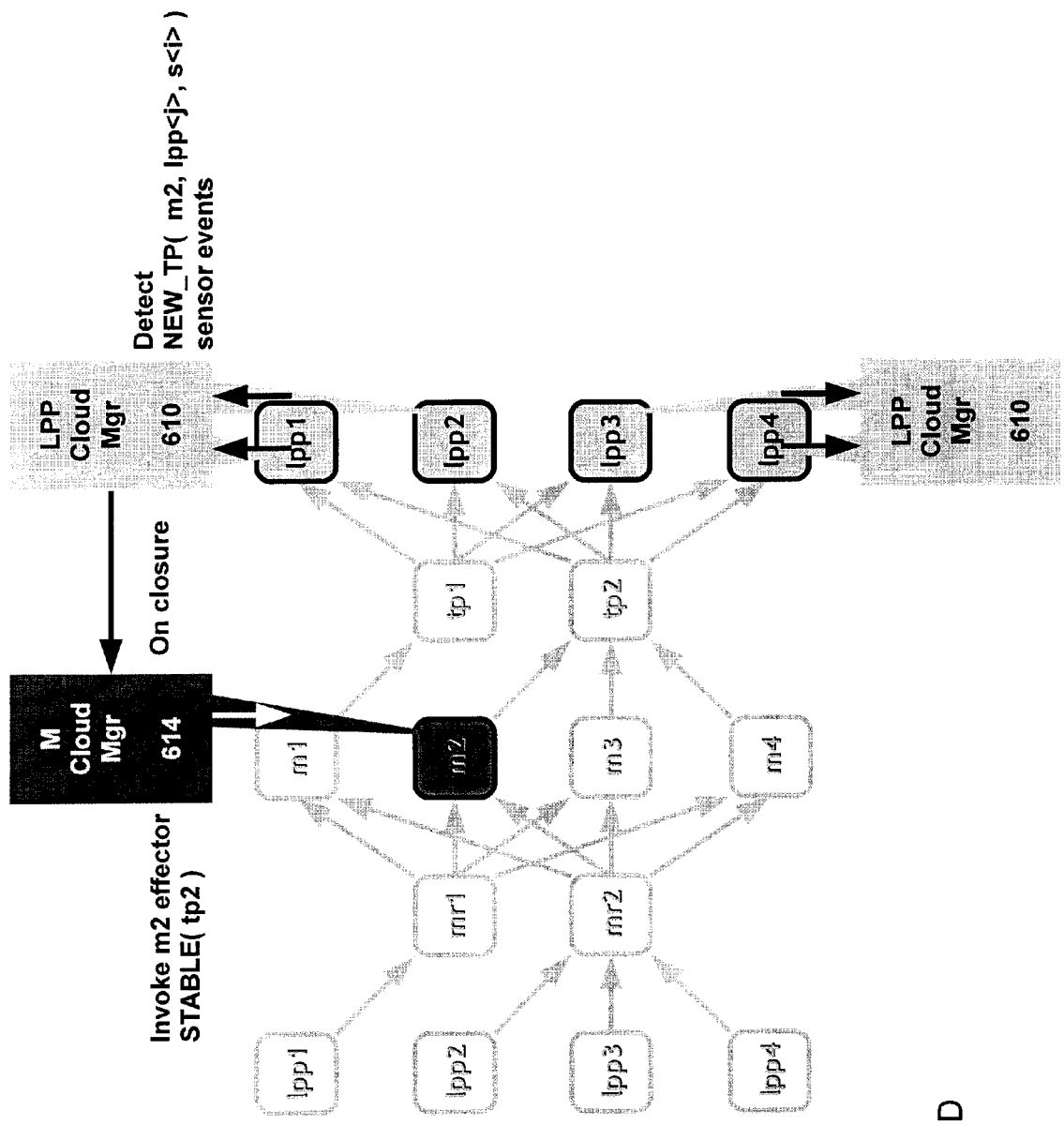

As shown in FIG. 11D, once both control messages have been received and any buffer flushed an NEW_TP(m2, lpp<j>, s<i>) sensor event is emitted by the LPP and detected by the M Cloud manager. Once all the NEW_TP sensor events corresponding to the previously stored TP_CHANGE sensor events have been detected, the LPP Cloud manager informs the M Cloud manager that the switchover cycle is complete and the M Cloud manager in turn invokes an effector method on m2 switching it to STABLE(tp2) state.

In some embodiments, the switchover of Ms between TPs would only be initiated by the M Cloud manager when all the Ms were in a STABLE state. Moreover, M Cloud manager may be designed not to initiate the transfer of mediation segments between while any M is in a SWITCHOVER state.

Upstream and Downstream Scale-Out and Scale-Back

As would be clear to one skilled in the art, similar techniques can be utilised to add or remove MR and TP nodes from the system on demand. In the case of addition this is achieved simply by obtaining the resources required; creating an MR or TP node and switching one or more LPP or M nodes to it respectively.

Figure 12A:
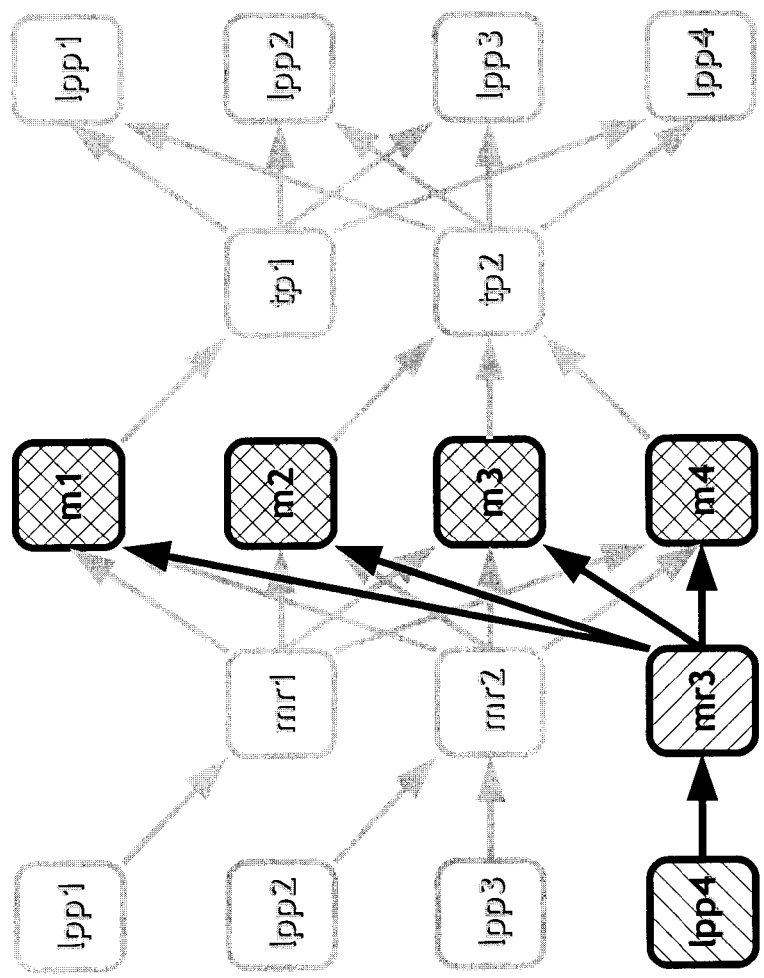
FIGS. 12A to 12D illustrate the addition of MR and TP nodes.

The net result of adding an MR node (mr3) to the network topology shown in FIGS. 10 and 11 and switching an LPP (lpp4) to it in response to the overall increase in workload across the existing MR nodes exceeding a threshold is illustrated in FIG. 12A. It follows from this that in order to remove an MR node if the overall reduction in workload across the existing MR nodes drops below a threshold all LPPs pointing at it must first be switched to other MR nodes.

Figure 12B:
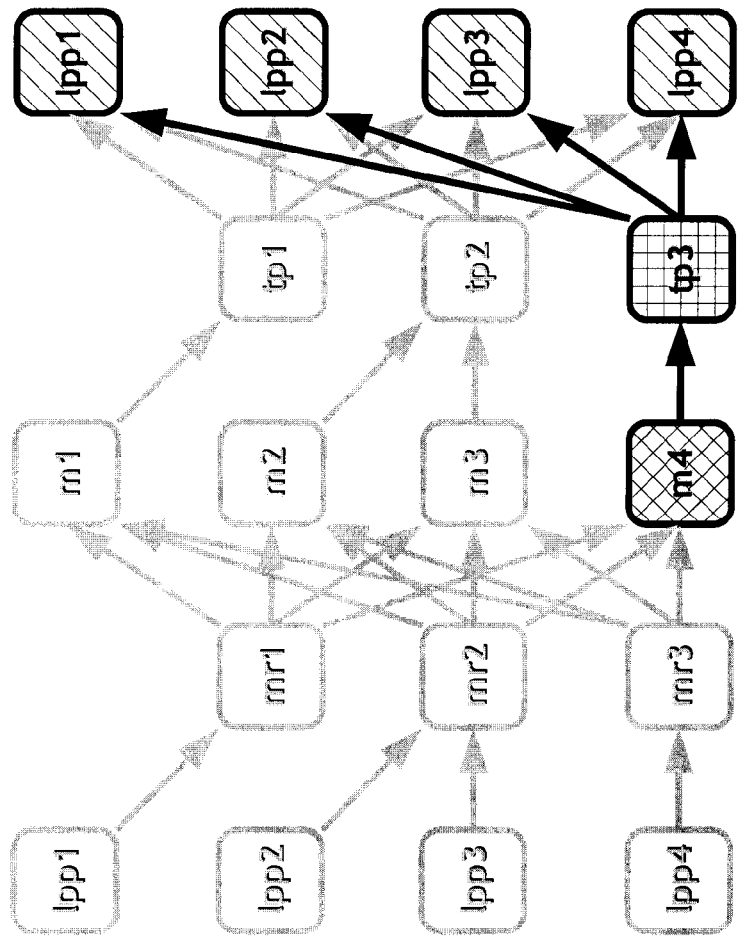
Figure 12C:
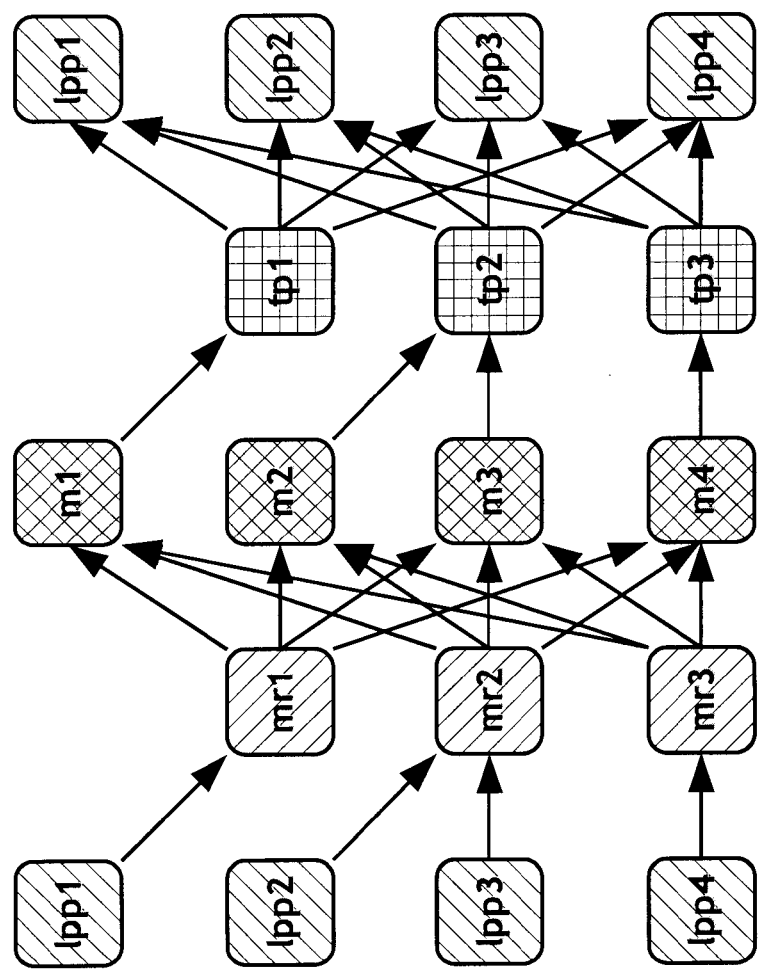

The net result of adding a TP node (tp3) to the resultant network topology and switching a mediator node (m4) to it in response to the overall increase in workload across the existing TP nodes exceeding a threshold is illustrated in FIGS. 12B and 12C. It follows from this that in order to remove a TP node if the overall reduction in workload across the existing TP nodes drops below a threshold all Ms pointing at it must first be switched to other TP nodes.

Figure 12D:
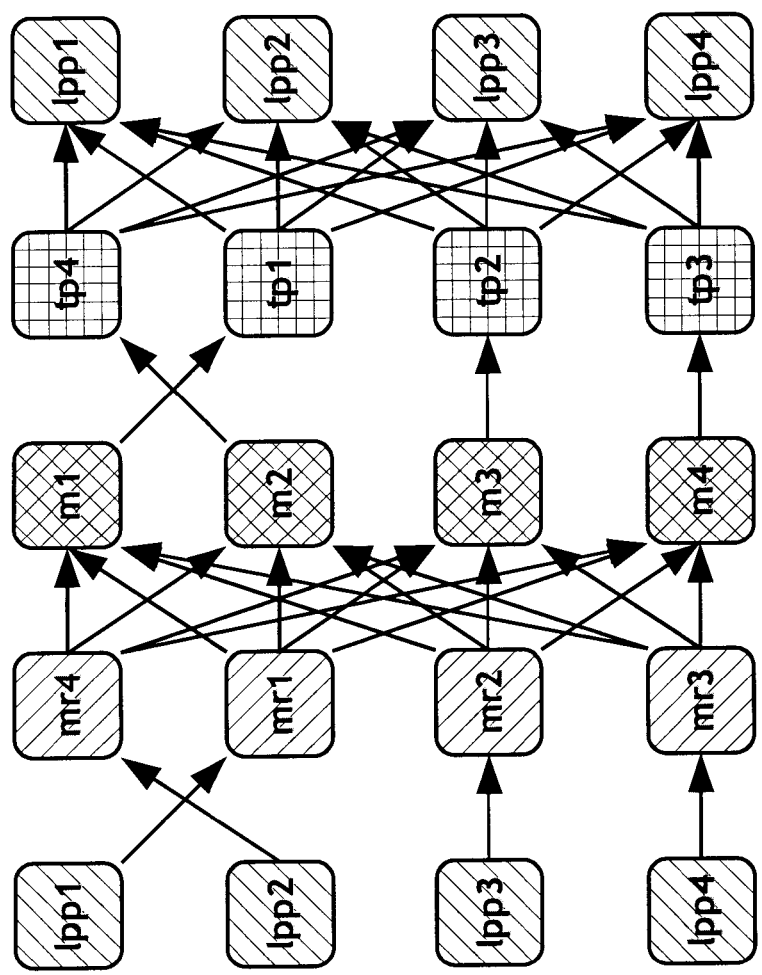

Finally, FIG. 12D shows a maximal configuration for the 4 LPP/4 M node network shown in FIGS. 10 and 11. In this case, each LPP has a dedicated MR and each M a dedicated TP. Given the constraints of the distributed mediation network it is not possible for the number of MRs to exceed the number of LPPs or the number of TPs to exceed the number of Ms in the network.

Exception Handling

Even with upstream, cross-stream and downstream load-balancing in place, there are some aspects of network load that cannot be dealt with by the methods described above. These exceptions are referred by the relevant cloud managers to the DMN for action.

M Cloud Manager

Exception: An M node hosting single segment s<i> becomes overloaded i.e. exceeds the high watermark for an individual M node. The M Cloud manager should raise this exception to the DMN manager.

Action: None possible unless we can differentiate between M nodes i.e. have a mix of M node capabilities with some hosted on more powerful machines (e.g. the latest multi-core chipset versus last year's model) in which case the load balancing algorithm can be refined to move the segment to a more powerful node although we will still hit this edge condition at some point.

Observation: What this exception highlights is a potential bottleneck where weakest link is an M node.

TP Cloud Manager

Exception: A TP node supporting a single m<j> node becomes overloaded i.e. exceeds the high water mark for an individual M node. The TP Cloud manager should raise this exception to the DMN Manager.

Action: If we can differentiate between TP nodes i.e. have a mix of TP node capabilities then the load balancing algorithm can be refined although we will still hit this edge condition at some point. Otherwise the DMN manager can inform the M Cloud manager that m<j> node is overloading network. If m<j> node is hosting multiple segments then in theory these could be redistributed.

Observation: What this highlights is a potential bottleneck where the weakest link is a TP node.

MR Cloud Manager

Exception: An MR node supporting a single lpp<k> node becomes overloaded i.e. exceeds the high watermark for an individual MR node. The MR Cloud manager should raise this exception to the DMN Manager.

Action: None possible unless we can differentiate between MR nodes i.e. have a mix of MR node capabilities then the load balancing algorithm can be refined although we will still hit this edge condition at some point.

Observation: What this exception highlights is a potential bottleneck where weakest link is an MR node.

In some embodiments, the observation at the DMN manager that an individual LPP is overloading an MR may lead to a readjustment of users amongst LPPs. The technique by which this is achieved will depend on the nature of the mediation service being provided to the users.

FIG. 13 shows Table 1, which provides a brief summary of some of the actions taken by the autonomic control plane to distribute network traffic amongst the nodes within the distributed mediation network. It shows the metrics or variables upon which the autonomic control plan makes decisions. The "X_NODE_HIGH_WATERMARK" represents the maximum threshold value that may be handled by a single type X node (where X may be LPP, TP, MR, or M), while the "X_NODE_POOL_HIGH_WATERMARK" represents the maximum average value of traffic throughput over a group of nodes of type X.

The invention claimed is:

1. A distributed mediation network, comprising:
a plurality of types of network modules forming a network topology, including:
local points of presence (LPP) modules for receiving and transmitting network traffic between the mediation network and client programs;
mediator (M) modules for hosting mediation tasks;
mediator router (MR) modules for analyzing the content of incoming messages, each MR module routing the incoming messages to a predetermined mediation task; and,
transmission proxy (TP) modules for forwarding messages to at least one of said LPP modules, wherein each of the MR, M and TP modules are adapted such that all paths for network traffic therethrough are non-reciprocal; and,
a processor that executes an autonomic control plane, said autonomic control plane being separate and distinct from said modules,
wherein the network couples network traffic along a unidirectional mediation cycle, in which:
the LLP module addresses incoming messages to a respective one of said mediator router (MR) modules;
said addressed one of said mediator router (MR) modules analyzes the content of incoming messages and routes said messages to a predetermined mediator module in dependence upon said analyzed content;
said predetermined mediator module applies the mediation task to said analyzed messages and directs said mediated messages to a respective one of said TP modules; and
said TP module that receives said mediated messages forwards said mediated messages to at least one of said LLP modules,
wherein the autonomic control plane controls said modules and manages the load across the network wherein managing the load across the network comprises the alteration of the destination of network traffic from an LPP module from a first MR module to a second MR module, the alteration comprising:
the autonomic control plane calling a SWITCH_MR effector method on the LPP module;
the LPP module, on receipt of the SWITCH_MR effector method, changing state to a SWITCHOVER state, sending an MR_CHANGE control signal to the first MR module, and sending a NEW_MR control signal to a second MR module;
the first MR module, on receipt of the MR_CHANGE control signal, forwarding the MR_CHANGE signal to each M module and emitting an MR_CHANGE sensor event to the autonomic control plane for each M module to which the MR_CHANGE control signal has been sent;
the second MR module, on receipt of the NEW_MR control signal, forwarding the NEW_MR control signal to each M module, wherein the M modules are adapted to buffer content received after the NEW_MR control signal but prior to the MR_CHANGE control signal, thereby ensuring that content is processed in the correct order, each M module sending a sensor event to the autonomic control plane on receipt of the NEW_MR control signal; and
the autonomic control plane, upon receipt of a sensor event from all M modules for which an MR_CHANGE sensor event has been received from the first MR module, calling an effector method to return the LPP module to a STABLE state.

2. A distributed mediation network according to claim 1, wherein the autonomic control plane is adapted to regulate the numbers of each type of module.

3. A distributed mediation network according to claim 1, wherein the autonomic control plane is hosted across a number of resources.

4. A distributed mediation network according to claim 1, wherein the modules contain sensor interfaces for communicating the status of the modules to the autonomic control plane.

5. A distributed mediation network according to claim 1, wherein the modules contain effector interfaces for receiving commands from the autonomic control plane.

6. A distributed mediation network according to claim 1, wherein the autonomic control plane has a hierarchical structure comprising cloud managers for each type of network node, each cloud manager for managing the distribution of network traffic amongst modules of a given type and responsible for load balancing by increasing or decreasing the number of modules of the cloud manager's respective type in the network, and a distributed mediation network (DMN) manager for managing the distribution of resources between the module types.

7. A distributed mediation network according to claim 1, wherein the incoming network traffic to the mediation network belongs to one of the group of message types including:
new information, which emanates from a process acting as an information source;
queries about state of nodes in the mediation network, which require a reply; and
expressions of interest, which require ongoing replies whenever pertinent new information is received by the mediation network.

8. A distributed mediation network according to claim 6, wherein the cloud managers are able to communicate directly.

9. A distributed mediation network according to claim 6, wherein all communication between cloud managers must pass through the DMN manager.

10. A distributed mediation network, comprising:
a plurality of types of network modules forming a network topology, including:
local points of presence (LPP) modules for receiving and transmitting network traffic between the mediation network and client programs;
mediator (M) modules for hosting mediation tasks;
mediator router (MR) modules for analyzing the content of incoming messages, each MR module routing the incoming messages to a predetermined mediation task; and,
transmission proxy (TP) modules for forwarding messages to at least one of said LPP modules, wherein each of the MR, M and TP modules are adapted such that all paths for network traffic therethrough are non-reciprocal; and,
a processor that executes an autonomic control plane, said autonomic control plane being separate and distinct from said modules,
wherein the network couples network traffic along a unidirectional mediation cycle, in which:
the LLP module addresses incoming messages to a respective one of said mediator router (MR) modules;
said addressed one of said mediator router (MR) modules analyzes the content of incoming messages and routes said messages to a predetermined mediator module in dependence upon said analyzed content;

said predetermined mediator module applies the mediation task to said analyzed messages and directs said mediated messages to a respective one of said TP modules; and said TP module that receives said mediated messages forwards said mediated messages to at least one of said LLP modules, wherein the autonomic control plane controls said modules and manages the load across the network, wherein managing the load comprises the alteration of the destination of network traffic from an M module from a first TP module to a second TP module, the alteration comprising:

the autonomic control plane calling a SWITCH_TP effector method on the M module;

the M module, on receipt of the SWITCH_TP effector method, changing state to a SWITCHOVER state, sending a TP_CHANGE control signal to the first TP module, and sending a NEW_TP control signal to the second TP module;

the first TP module, on receipt of the TP_CHANGE control signal, forwarding the TP_CHANGE signal to each LPP module and emitting an TP_CHANGE sensor event to the autonomic control plane for each LPP to which the TP_CHANGE control signal has been sent;

the second TP module, on receipt of the NEW_TP control signal, forwarding the NEW_TP control signal to each LPP module, wherein the LPP modules are adapted to buffer content received after the NEW_TP control signal but prior to the TP_CHANGE control signal, thereby ensuring that content is processed in the correct order;

each LPP module sending a sensor event to the autonomic control plane on receipt of the NEW_TP control signal; and the autonomic control plane, upon receipt of a sensor event from all LPP modules for which a TP_CHANGE sensor event has been received from the first TP, calling an effector method to return the M module to a STABLE state.

11. A distributed mediation network according to claim 10, wherein the autonomic control plane is adapted to regulate the numbers of each type of module.

12. A distributed mediation network according to claim 10, wherein the autonomic control plane is hosted across a number of resources.

13. A distributed mediation network according to claim 10, wherein the modules contain sensor interfaces for communicating the status of the modules to the autonomic control plane.

14. A distributed mediation network according to claim 10, wherein the modules contain effector interfaces for receiving commands from the autonomic control plane.

15. A distributed mediation network according to claim 10, wherein the autonomic control plane has a hierarchical structure comprising cloud managers for each type of network node, each cloud manager for managing the distribution of network traffic amongst modules of a given type and responsible for load balancing by increasing or decreasing the number of modules of the cloud manager's respective type in the network, and a distributed mediation network (DMN) manager for managing the distribution of resources between the module types.

16. A distributed mediation network according to claim 10, wherein the incoming network traffic to the mediation network belongs to one of the group of message types including:
new information, which emanates from a process acting as an information source;
queries about state of nodes in the mediation network, which require a reply; and
expressions of interest, which require ongoing replies whenever pertinent new information is received by the mediation network.

17. A distributed mediation network according to claim 15, wherein the cloud managers are able to communicate directly.

18. A distributed mediation network according to claim 15, wherein all communication between cloud managers must pass through the DMN manager.

19. A method for mediating the flow of network traffic in a computer network, wherein the computer network has a mediation network that comprises a plurality of types of network modules forming a network topology, including:

local points of presence (LPP) modules for receiving and transmitting network traffic between the mediation network and client programs;

mediator (M) modules for hosting mediation tasks;

mediator router (MR) modules for analyzing the content of incoming messages, each MR module routing the incoming messages to a predetermined mediation task in dependence upon said content; and, transmission proxy (TP) modules for forwarding messages to at least one of said LPP modules, wherein each of the MR, M and TP modules are adapted such that all paths for network traffic therethrough are non-reciprocal; and, wherein a processor executes an autonomic control plane for managing the distribution of network traffic amongst the modules, wherein, in the method, incoming messages are propagated along a mediation cycle that comprises the steps of:

an LPP module addressing incoming messages to a respective one of said mediator router (MR) modules;

at said addressed MR module, analyzing the content of incoming messages and routing said messages to a predetermined mediator module in dependence upon said analyzed content;

at said predetermined mediator module, applying the mediation task to said analyzed messages and directing said mediated messages to a respective one of said TP modules; and at said TP module that receives said mediated messages, forwarding said mediated messages to at least one of said LPP modules, wherein the autonomic control plane manages the load across the network by altering the destination of network traffic from an LPP module from a first MR module to a second MR module, the alteration comprising:

the autonomic control plane calling a SWITCH_MR effector method on the LPP module;

the LPP module, on receipt of the SWITCH_MR effector method, changing state to a SWITCHOVER state, sending an MR_CHANGE control signal to the first MR module, and sending a NEW_MR control signal to a second MR module;

the first MR module, on receipt of the MR_CHANGE control signal, forwarding the MR_CHANGE signal to each M module and emitting an MR_CHANGE sensor event to the autonomic control plane for each M module to which the MR_CHANGE control signal has been sent;

the second MR module, on receipt of the NEW_MR control signal, forwarding the NEW_MR control signal to each M module, wherein the M modules are adapted to buffer content received after the NEW_MR control signal but prior to the MR_CHANGE control signal, thereby ensuring that content is processed in the correct order;

each M module sending a sensor event to the autonomic control plane on receipt of the NEW_MR control signal; and the autonomic control plane, upon receipt of a sensor event from all M modules for which an MR_CHANGE sensor event has been received from the first MR module, calling an effector method to return the LPP module to a STABLE state.

20. A method according to claim 19, wherein the autonomic control plane regulates the numbers of each type of module.

21. A method according to claim 19, wherein the autonomic control plane is hosted across a number of resources.

22. A method according to claim 19, the method further comprising communicating the status of the modules to the autonomic control plane using sensor interfaces contained by the modules.

23. A method according to claim 19, further comprising receiving commands from the autonomic control plane using effector interfaces contained by the modules.

24. A method according to claim 19, wherein the autonomic control plane has a hierarchical structure comprising cloud managers for each type of network node, wherein the method further comprises:
each cloud manager managing the distribution of network traffic amongst modules of a given type;
each cloud manager load balancing by increasing or decreasing the number of modules of the cloud manager's respective type in the network; and
managing, by a distributed mediation network (DMN) manager, the distribution of resources between the module types.

25. A method according to claim 19, wherein the incoming network traffic to the mediation network belongs to one of the group of message types including:
new information, which emanates from a process acting as an information source;
queries about state of nodes in the mediation network, which require a reply; and
expressions of interest, which require ongoing replies whenever pertinent new information is received by the mediation network.

26. A method according to claim 24, wherein the cloud managers are able to communicate directly.

27. A method according to claim 24, wherein all communication between cloud managers must pass through the DMN manager.

28. A method for mediating the flow of network traffic in a computer network, wherein the computer network has a mediation network that comprises a plurality of types of network modules forming a network topology, including:
local points of presence (LPP) modules for receiving and transmitting network traffic between the mediation network and client programs;
mediator (M) modules for hosting mediation tasks;
mediator router (MR) modules for analyzing the content of incoming messages, each MR module routing the incoming messages to a predetermined mediation task in dependence upon said content; and,
transmission proxy (TP) modules for forwarding messages to at least one of said LPP modules, wherein each of the MR, M and TP modules are adapted such that all paths for network traffic therethrough are non-reciprocal; and, wherein a processor executes an autonomic control plane for managing the distribution of network traffic amongst the modules, wherein, in the method, incoming messages are propagated along a mediation cycle that comprises the steps of:
an LPP module addressing incoming messages to a respective one of said at least one mediator router (MR) modules;
at said addressed MR module, analyzing the content of incoming messages and routing said messages to a predetermined mediator module in dependence upon said analyzed content;
at said predetermined mediator module, applying the mediation task to said analyzed messages and directing said mediated messages to a respective one of said TP modules; and
at said TP module that receives said mediated messages, forwarding said mediated messages to at least one of said LPP modules, and wherein the autonomic control plane manages the load across the network by altering the destination of network traffic from an M module from a first TP module to a second TP module, the alteration comprising:
the autonomic control plane calling a SWITCH_TP effector method on the M module;
the M module, on receipt of the SWITCH_TP effector method, changing state to a SWITCHOVER state, sending a TP_CHANGE control signal to the first TP module, and sending a NEW_TP control signal to the second TP module;
the first TP module, on receipt of the TP_CHANGE control signal, forwarding the TP_CHANGE signal to each LPP module and emitting an TP_CHANGE sensor event to the autonomic control plane for each LPP to which the TP_CHANGE control signal has been sent;
the second TP module, on receipt of the NEW_TP control signal, forwarding the NEW_TP control signal to each LPP module, wherein the LPP modules are adapted to buffer content received after the NEW_TP control signal but prior to the TP_CHANGE control signal, thereby ensuring that content is processed in the correct order;
each LPP module sending a sensor event to the autonomic control plane on receipt of the NEW_TP control signal; and
the autonomic control plane, upon receipt of a sensor event from all LPP modules for which a TP_CHANGE sensor event has been received from the first TP, calling an effector method to return the M module to a STABLE state.

29. A method according to claim 28, wherein the autonomic control plane regulates the numbers of each type of module.

30. A method according to claim 28, wherein the autonomic control plane is hosted across a number of resources.

31. A method according to claim 28, the method further comprising communicating the status of the modules to the autonomic control plane using sensor interfaces contained by the modules.

32. A method according to claim 28, further comprising receiving commands from the autonomic control plane using effector interfaces contained by the modules.

33. A method according to claim 28, wherein the autonomic control plane has a hierarchical structure comprising cloud managers for each type of network node,
wherein the method further comprises:
each cloud manager managing the distribution of network traffic amongst modules of a given type;

each cloud manager load balancing by increasing or decreasing the number of modules of the cloud manager's respective type in the network; and managing, by a distributed mediation network (DMN) manager, the distribution of resources between the module types.

34. A method according to claim 28, wherein the incoming network traffic to the mediation network belongs to one of the group of message types including:

new information, which emanates from a process acting as an information source;

queries about state of nodes in the mediation network, which require a reply; and expressions of interest, which require ongoing replies whenever pertinent new information is received by the mediation network.

35. A method according to claim 33, wherein the cloud managers are able to communicate directly.

36. A method according to claim 33, wherein all communication between cloud managers must pass through the DMN manager.

* * * * *